United States Patent
Tooker et al.

(10) Patent No.: US 9,953,481 B2
(45) Date of Patent: Apr. 24, 2018

(54) JUKEBOX WITH ASSOCIATED VIDEO SERVER

(75) Inventors: Michael Tooker, Pointe Claire (CA); Dominique Dion, Verdun Nun's Island (CA); Guy Nathan, Verdun Nun's Island (CA)

(73) Assignee: TouchTunes Music Corporation, Quebec (CA)

( * ) Notice: Subject to any disclaimer, the term of this patent is extended or adjusted under 35 U.S.C. 154(b) by 998 days.

(21) Appl. No.: 12/076,761

(22) Filed: Mar. 21, 2008

(65) Prior Publication Data

US 2008/0239887 A1    Oct. 2, 2008

Related U.S. Application Data

(60) Provisional application No. 60/907,212, filed on Mar. 26, 2007.

(51) Int. Cl.
*G07F 17/00*    (2006.01)
*G06F 3/0482*    (2013.01)
(Continued)

(52) U.S. Cl.
CPC ............ *G07F 17/00* (2013.01); *G06F 3/0482* (2013.01); *G07F 17/305* (2013.01); *H04N 21/00* (2013.01);
(Continued)

(58) Field of Classification Search
CPC . B82Y 10/00; G11B 11/10532; G11B 27/002; G07F 5/18; G07F 11/002;
(Continued)

(56) References Cited

U.S. PATENT DOCUMENTS 3,807,541 A    4/1974    Kortenhaus
3,982,620 A    9/1976    Kotenhaus
(Continued)

FOREIGN PATENT DOCUMENTS

AU    199954012    4/2000
CN    1901670    1/2007
(Continued)

OTHER PUBLICATIONS

Drews, C.; Pestoni, F.; , "Virtual jukebox: reviving a classic," System Sciences, 2002. HICSS. Proceedings of the 35th Annual Hawaii International Conference on , vol., No., pp. 887-893, Jan. 7-10, 2002 doi: 10.1109/HICSS.2002.994055 URL: http://ieeexplore.ieee.org/stamp/stamp.jsp?tp=&arnumber=994055&isnumber=21442.*

(Continued)

*Primary Examiner* — David Lazaro
(74) *Attorney, Agent, or Firm* — Nixon & Vanderhye, P.C.

(57) ABSTRACT

In certain example embodiments, jukebox systems that have associated video servers for displaying video content on one or more displays or groups of displays external to the jukebox and/or directly on the jukebox are provided. Such video servers may effectively off-load at least some of the video processing load from the jukebox device. Accordingly, video content may be provided to complement and/or further enhance the interactive experience that jukeboxes currently provide, while also enabling patrons not directly in front of the jukebox to participate in the interactive process. Content may be distributed to the jukeboxes and/or video servers via a network. In addition to creating a compelling entertainment experience for patrons, it also is possible to create new revenue opportunities for customers. For example, operators and national account customers and advertising partners (Continued)

may provide additional value to venues through the innovative use of managed video content.

26 Claims, 17 Drawing Sheets

(51) Int. Cl.
- *H04N 21/20* (2011.01)
- *H04N 21/40* (2011.01)
- *G07F 17/30* (2006.01)
- *H04N 21/00* (2011.01)
- *H04N 21/80* (2011.01)

(52) U.S. Cl.
CPC ............. *H04N 21/20* (2013.01); *H04N 21/40* (2013.01); *H04N 21/80* (2013.01)

(58) Field of Classification Search
CPC .. G07F 17/305; G06F 15/16; G06F 17/30772; G06F 17/30749; G06F 21/10; G06F 3/0482; G06F 3/0686; G06F 17/3074; H04N 21/47202; H04N 21/8113
USPC ....... 709/231, 219, 223, 218, 217, 214, 203, 709/225, 221, 227; 455/426.1, 41.2, 344, 455/3.06, 186.1, 554.2; 386/96, 95, 69, 386/126; 705/7, 59, 30, 14.1
See application file for complete search history.

(56) References Cited

U.S. PATENT DOCUMENTS

| | | | |
|---|---|---|---|
| 4,008,369 A | 2/1977 | Theurer et al. |
| 4,186,438 A | 1/1980 | Benson |
| 4,232,295 A | 11/1980 | McConnell |
| 4,335,809 A | 6/1982 | Wain |
| 4,335,908 A | 6/1982 | Burge |
| 4,356,509 A | 10/1982 | Skerlos et al. |
| 4,369,442 A | 1/1983 | Werth et al. |
| 4,375,287 A | 3/1983 | Smith |
| 4,412,292 A | 10/1983 | Sedam |
| 4,413,260 A | 11/1983 | Siegel et al. |
| 4,521,014 A | 6/1985 | Sitrick |
| 4,528,643 A | 7/1985 | Freeny |
| 4,558,413 A | 12/1985 | Schmidt |
| 4,572,509 A | 2/1986 | Sitrick |
| 4,577,333 A | 3/1986 | Lewis et al. |
| 4,582,324 A | 4/1986 | Koza |
| 4,588,187 A | 5/1986 | Dell |
| 4,593,904 A | 6/1986 | Graves |
| 4,597,058 A | 6/1986 | Izumi |
| 4,636,951 A | 1/1987 | Harlick |
| 4,652,998 A | 3/1987 | Koza |
| 4,654,799 A | 3/1987 | Ogaki |
| 4,658,093 A | 4/1987 | Hellman |
| 4,667,802 A | 5/1987 | Verduin et al. |
| 4,674,055 A | 6/1987 | Ogaki et al. |
| 4,675,538 A | 6/1987 | Epstein |
| 4,677,311 A | 6/1987 | Morita |
| 4,677,565 A | 6/1987 | Ogaki |
| 4,703,465 A | 10/1987 | Parker |
| 4,704,725 A | 11/1987 | Harvey et al. |
| 4,707,804 A | 11/1987 | Leal |
| 4,722,053 A | 1/1988 | Dubno |
| 4,761,684 A | 8/1988 | Clark |
| 4,766,581 A | 8/1988 | Korn |
| 4,787,050 A | 11/1988 | Suzuki |
| 4,792,849 A | 12/1988 | McCalley |
| 4,807,052 A | 2/1989 | Amano |
| 4,811,325 A | 3/1989 | Sharples |
| 4,814,972 A | 3/1989 | Winter et al. |
| 4,825,054 A | 4/1989 | Rust |
| 4,829,570 A | 5/1989 | Schotz |
| 4,852,154 A | 7/1989 | Lewis et al. |
| 4,857,714 A | 8/1989 | Sunyich |
| 4,868,832 A | 9/1989 | Marrington |
| 4,885,694 A | 12/1989 | Pray et al. |
| 4,905,279 A | 2/1990 | Nishio |
| 4,920,432 A | 4/1990 | Eggers |
| 4,922,420 A | 5/1990 | Nakagawa |
| 4,924,378 A | 5/1990 | Hershey |
| 4,926,485 A | 5/1990 | Yamashita |
| 4,937,807 A | 6/1990 | Weitz |
| 4,949,187 A | 8/1990 | Cohen |
| 4,953,159 A | 8/1990 | Hayden et al. |
| 4,956,768 A | 9/1990 | Sidi |
| 4,958,835 A | 9/1990 | Tashiro |
| 4,977,593 A | 12/1990 | Ballance |
| 4,999,806 A | 3/1991 | Chernow |
| 5,008,814 A | 4/1991 | Mathur |
| 5,012,121 A | 4/1991 | Hammond |
| 5,027,426 A | 6/1991 | Chiocca |
| 5,041,921 A | 8/1991 | Scheffler |
| 5,046,093 A | 9/1991 | Wachob |
| 5,053,758 A | 10/1991 | Cornett et al. |
| 5,058,089 A | 10/1991 | Yoshimara |
| 5,077,607 A | 12/1991 | Johnson et al. |
| 5,081,534 A | 1/1992 | Geiger et al. |
| 5,101,499 A | 3/1992 | Streck et al. |
| 5,106,097 A | 4/1992 | Levine |
| 5,117,407 A | 5/1992 | Vogel |
| 5,138,712 A | 8/1992 | Corbin |
| 5,148,159 A | 9/1992 | Clark et al. |
| 5,155,847 A | 10/1992 | Kirouac |
| 5,163,131 A | 11/1992 | Row |
| 5,166,886 A | 11/1992 | Molnar |
| 5,172,413 A | 12/1992 | Bradley et al. |
| 5,180,309 A | 1/1993 | Egnor |
| 5,189,630 A | 2/1993 | Barstow et al. |
| 5,191,573 A | 3/1993 | Hair |
| 5,191,611 A | 3/1993 | Lang |
| 5,192,999 A | 3/1993 | Graczyk |
| 5,197,094 A | 3/1993 | Tillery |
| 5,203,028 A | 4/1993 | Shiraishi |
| 5,210,854 A | 5/1993 | Beaverton et al. |
| 5,214,761 A | 5/1993 | Barrett et al. |
| 5,222,134 A | 6/1993 | Waite et al. |
| 5,228,015 A | 7/1993 | Arbiter et al. |
| 5,237,157 A | 8/1993 | Kaplan |
| 5,237,322 A | 8/1993 | Heberle |
| 5,239,480 A | 8/1993 | Huegel |
| 5,250,747 A | 10/1993 | Tsumura |
| 5,252,775 A | 10/1993 | Urano |
| 5,260,999 A | 11/1993 | Wyman |
| 5,261,104 A | 11/1993 | Bertram et al. |
| 5,262,875 A | 11/1993 | Mincer et al. |
| 5,276,866 A | 1/1994 | Paolini |
| 5,278,904 A | 1/1994 | Servi |
| 5,282,028 A | 1/1994 | Johnson et al. |
| 5,289,476 A | 2/1994 | Johnson et al. |
| 5,289,546 A | 2/1994 | Hetherington |
| 5,315,161 A | 5/1994 | Robinson |
| 5,315,711 A | 5/1994 | Barone et al. |
| 5,319,455 A | 6/1994 | Hoarty et al. |
| 5,321,846 A | 6/1994 | Yokota et al. |
| 5,327,230 A | 7/1994 | Dockery |
| 5,339,095 A | 8/1994 | Redford |
| 5,339,413 A | 8/1994 | Koval |
| 5,341,350 A | 8/1994 | Frank |
| 5,355,302 A | 10/1994 | Martin et al. |
| 5,357,276 A | 10/1994 | Banker |
| 5,369,778 A | 11/1994 | SanSoucie |
| 5,375,206 A | 12/1994 | Hunter |
| 5,386,251 A | 1/1995 | Movshovich |
| 5,389,950 A | 2/1995 | Martin et al. |
| 5,404,505 A | 4/1995 | Levinson |
| 5,406,634 A | 4/1995 | Anderson et al. |
| 5,408,417 A | 4/1995 | Wilder |
| 5,410,326 A | 4/1995 | Goldstein |
| 5,410,703 A | 4/1995 | Nilsson et al. |
| 5,418,713 A | 5/1995 | Allen |
| 5,420,923 A | 5/1995 | Beyers |
| 5,428,252 A | 6/1995 | Walker |

(56) References Cited

U.S. PATENT DOCUMENTS

| | | |
|---|---|---|
| 5,428,606 A | 6/1995 | Moskowitz |
| 5,431,492 A | 7/1995 | Rothschild |
| 5,440,632 A | 8/1995 | Bacon et al. |
| 5,444,499 A | 8/1995 | Saitoh |
| 5,445,295 A | 8/1995 | Brown |
| 5,455,619 A | 10/1995 | Truckenmiller et al. |
| 5,455,926 A | 10/1995 | Keele |
| 5,457,305 A | 10/1995 | Akel |
| 5,465,213 A | 11/1995 | Ross |
| 5,467,326 A | 11/1995 | Miyashita et al. |
| 5,469,370 A | 11/1995 | Ostrover et al. |
| 5,469,573 A | 11/1995 | McGill et al. |
| 5,471,576 A | 11/1995 | Yee |
| 5,475,835 A | 12/1995 | Hickey |
| 5,481,509 A | 1/1996 | Knowles |
| 5,487,167 A | 1/1996 | Dinallo et al. |
| 5,489,103 A | 2/1996 | Okamoto |
| 5,495,610 A | 2/1996 | Shing |
| 5,496,178 A | 3/1996 | Back |
| 5,499,921 A | 3/1996 | Sone |
| 5,511,000 A | 4/1996 | Kaloi |
| 5,513,117 A | 4/1996 | Small |
| 5,515,173 A | 5/1996 | Mankovitz et al. |
| 5,519,435 A | 5/1996 | Anderson |
| 5,519,457 A | 5/1996 | Nishigaki et al. |
| 5,521,631 A | 5/1996 | Budow et al. |
| 5,521,918 A | 5/1996 | Kim |
| 5,521,922 A | 5/1996 | Fujinami et al. |
| 5,523,781 A | 6/1996 | Brusaw |
| 5,528,732 A | 6/1996 | Klotz |
| 5,532,734 A | 7/1996 | Goertz |
| 5,546,039 A | 8/1996 | Hewitt et al. |
| 5,548,729 A | 8/1996 | Akiyoshi |
| 5,550,577 A | 8/1996 | Verbiest |
| 5,554,968 A | 9/1996 | Lee |
| 5,555,244 A | 9/1996 | Gupta |
| 5,557,541 A | 9/1996 | Schulhof |
| 5,557,724 A | 9/1996 | Sampat et al. |
| 5,559,505 A | 9/1996 | McNair |
| 5,559,549 A | 9/1996 | Hendricks |
| 5,561,709 A | 10/1996 | Remillard |
| 5,565,908 A | 10/1996 | Ahmad |
| 5,566,237 A | 10/1996 | Dobbs |
| 5,570,363 A | 10/1996 | Holm |
| 5,578,999 A | 11/1996 | Matsuzawa et al. |
| 5,579,404 A | 11/1996 | Fielder et al. |
| 5,583,561 A | 12/1996 | Baker et al. |
| 5,583,937 A | 12/1996 | Ullrich et al. |
| 5,583,994 A | 12/1996 | Rangan |
| 5,583,995 A | 12/1996 | Gardner et al. |
| 5,592,482 A | 1/1997 | Abraham |
| 5,592,551 A | 1/1997 | Lett |
| 5,592,611 A | 1/1997 | Midgely et al. |
| 5,594,509 A | 1/1997 | Florin |
| 5,596,702 A | 1/1997 | Stucka et al. |
| 5,612,581 A | 3/1997 | Kageyama |
| 5,613,909 A | 3/1997 | Stelovsky |
| 5,616,876 A | 4/1997 | Cluts |
| 5,617,565 A | 4/1997 | Augenbraun et al. |
| 5,619,247 A | 4/1997 | Russo |
| 5,619,249 A | 4/1997 | Billock et al. |
| 5,619,250 A | 4/1997 | McClellan et al. |
| 5,619,698 A | 4/1997 | Lillich |
| 5,623,666 A | 4/1997 | Pike |
| 5,631,693 A | 5/1997 | Wunderlich et al. |
| 5,636,276 A | 6/1997 | Brugger |
| 5,638,426 A | 6/1997 | Lewis |
| 5,642,337 A | 6/1997 | Oskay |
| 5,644,714 A | 7/1997 | Kikinis |
| 5,644,766 A | 7/1997 | Coy |
| 5,654,714 A | 8/1997 | Takahashi et al. |
| 5,659,466 A | 8/1997 | Norris et al. |
| 5,661,517 A | 8/1997 | Budow et al. |
| 5,661,802 A | 8/1997 | Nilssen |
| 5,663,756 A | 9/1997 | Blahut et al. |
| 5,668,592 A | 9/1997 | Spaulding |
| 5,668,778 A | 9/1997 | Quazi |
| 5,668,788 A | 9/1997 | Allison |
| 5,675,734 A | 10/1997 | Hair |
| 5,680,533 A | 10/1997 | Yamato et al. |
| 5,684,716 A | 11/1997 | Freeman |
| 5,689,641 A | 11/1997 | Ludwig et al. |
| 5,691,778 A | 11/1997 | Song |
| 5,691,964 A | 11/1997 | Niederlein et al. |
| 5,696,914 A | 12/1997 | Nahaboo et al. |
| 5,697,844 A | 12/1997 | Von Kohorn |
| 5,703,795 A | 12/1997 | Mankowitz |
| 5,708,811 A | 1/1998 | Arendt |
| 5,712,976 A | 1/1998 | Falcon |
| 5,713,024 A | 1/1998 | Halladay |
| 5,715,416 A | 2/1998 | Baker |
| 5,717,452 A | 2/1998 | Janin et al. |
| 5,721,583 A | 2/1998 | Harada et al. |
| 5,721,815 A | 2/1998 | Ottesen et al. |
| 5,721,829 A | 2/1998 | Dunn et al. |
| 5,724,525 A | 3/1998 | Beyers et al. |
| 5,726,909 A | 3/1998 | Krikorian |
| 5,734,719 A | 3/1998 | Tsevdos |
| 5,734,961 A | 3/1998 | Castille |
| 5,739,451 A | 4/1998 | Winksy et al. |
| 5,743,745 A | 4/1998 | Reintjes |
| 5,745,391 A | 4/1998 | Topor |
| 5,748,254 A | 5/1998 | Harrison et al. |
| 5,748,468 A | 5/1998 | Notenboom et al. |
| 5,751,336 A | 5/1998 | Aggarwal et al. |
| 5,757,936 A | 5/1998 | Lee |
| 5,758,340 A | 5/1998 | Nail |
| 5,761,655 A | 6/1998 | Hoffman |
| 5,762,552 A | 6/1998 | Vuong |
| 5,774,527 A | 6/1998 | Handelman et al. |
| 5,774,668 A | 6/1998 | Choqiuer |
| 5,774,672 A | 6/1998 | Funahashi |
| 5,781,889 A | 7/1998 | Martin et al. |
| 5,786,784 A | 7/1998 | Gaudichon |
| 5,790,172 A | 8/1998 | Imanaka |
| 5,790,671 A | 8/1998 | Cooper |
| 5,790,856 A | 8/1998 | Lillich |
| 5,793,364 A | 8/1998 | Bolanos et al. |
| 5,793,980 A | 8/1998 | Glaser |
| 5,798,785 A | 8/1998 | Hendricks |
| 5,802,283 A | 9/1998 | Grady et al. |
| 5,802,599 A | 9/1998 | Cabrera |
| 5,805,804 A | 9/1998 | Laursen et al. |
| 5,808,224 A | 9/1998 | Kato |
| 5,809,246 A | 9/1998 | Goldman |
| 5,812,643 A | 9/1998 | Schelberg et al. |
| 5,815,146 A | 9/1998 | Youden et al. |
| 5,825,884 A | 10/1998 | Zdepski et al. |
| 5,831,555 A | 11/1998 | Yu et al. |
| 5,831,663 A | 11/1998 | Waterhouse et al. |
| 5,832,024 A | 11/1998 | Schotz et al. |
| 5,832,287 A | 11/1998 | Atalla |
| 5,835,843 A | 11/1998 | Haddad |
| 5,842,869 A | 12/1998 | McGregor et al. |
| 5,845,104 A | 12/1998 | Rao |
| 5,845,256 A | 12/1998 | Pescitelli et al. |
| 5,848,398 A | 12/1998 | Martin |
| 5,851,149 A | 12/1998 | Xidos et al. |
| 5,854,887 A | 12/1998 | Kindell |
| 5,857,020 A | 1/1999 | Peterson |
| 5,857,707 A | 1/1999 | Devlin |
| 5,862,324 A | 1/1999 | Collins |
| 5,864,811 A | 1/1999 | Tran et al. |
| 5,864,868 A | 1/1999 | Contois |
| 5,864,870 A | 1/1999 | Guck |
| 5,867,714 A | 2/1999 | Todd |
| 5,870,721 A | 2/1999 | Norris |
| 5,880,386 A | 3/1999 | Wachi et al. |
| 5,880,769 A | 3/1999 | Nemirofsky et al. |
| 5,884,028 A | 3/1999 | Kindell |
| 5,884,298 A | 3/1999 | Smith |
| 5,887,193 A | 3/1999 | Takahashi |
| 5,896,094 A | 4/1999 | Narisada et al. |
| 5,903,266 A | 5/1999 | Berstis et al. |

(56) References Cited

U.S. PATENT DOCUMENTS

| | | | |
|---|---|---|---|
| 5,913,040 A | 6/1999 | Rakavy |
| 5,914,712 A | 6/1999 | Sartain et al. |
| 5,915,094 A | 6/1999 | Kouloheris |
| 5,915,238 A | 6/1999 | Tjaden |
| 5,917,537 A | 6/1999 | Lightfoot |
| 5,917,835 A | 6/1999 | Barrett |
| 5,918,213 A | 6/1999 | Bernard et al. |
| 5,920,700 A | 7/1999 | Gordon et al. |
| 5,920,702 A | 7/1999 | Johnson |
| 5,923,885 A | 7/1999 | Johnson |
| 5,926,531 A | 7/1999 | Petite |
| 5,930,765 A | 7/1999 | Martin |
| 5,931,908 A | 8/1999 | Gerba |
| 5,933,090 A | 8/1999 | Christenson |
| 5,940,504 A | 8/1999 | Griswold |
| 5,949,411 A | 9/1999 | Doerr et al. |
| 5,949,688 A | 9/1999 | Montoya |
| 5,953,429 A | 9/1999 | Wakai et al. |
| 5,956,716 A | 9/1999 | Kenner et al. |
| 5,959,869 A | 9/1999 | Miller |
| 5,959,945 A | 9/1999 | Kleiman |
| 5,963,916 A | 10/1999 | Kaplan |
| 5,966,495 A | 10/1999 | Takahashi |
| 5,978,855 A | 11/1999 | Metz |
| 5,978,912 A | 11/1999 | Rakavy et al. |
| 5,980,261 A | 11/1999 | Mino et al. |
| 5,999,499 A | 12/1999 | Pines et al. |
| 5,999,624 A | 12/1999 | Hopkins |
| 6,002,720 A | 12/1999 | Yurt |
| 6,005,599 A | 12/1999 | Asai et al. |
| 6,008,735 A | 12/1999 | Chiloyan et al. |
| 6,009,274 A | 12/1999 | Fletcher |
| 6,011,758 A | 1/2000 | Dockes et al. |
| 6,018,337 A | 1/2000 | Peters |
| 6,018,726 A | 1/2000 | Tsumura |
| 6,025,868 A | 2/2000 | Russo |
| 6,034,925 A | 3/2000 | Wehmeyer |
| 6,038,591 A | 3/2000 | Wolfe et al. |
| 6,040,829 A | 3/2000 | Croy et al. |
| 6,041,354 A | 3/2000 | Biliris et al. |
| 6,054,987 A | 4/2000 | Richardson |
| 6,055,573 A | 4/2000 | Gardenswartz et al. |
| 6,057,874 A | 5/2000 | Michaud |
| 6,069,672 A | 5/2000 | Claassen |
| 6,072,982 A | 6/2000 | Haddad |
| 6,107,937 A | 8/2000 | Hamada |
| 6,118,450 A * | 9/2000 | Proehl ............ G06F 17/30017 348/E5.105 |
| 6,124,804 A | 9/2000 | Kitao et al. |
| 6,131,088 A | 10/2000 | Hill |
| 6,131,121 A | 10/2000 | Mattaway et al. |
| 6,134,547 A | 10/2000 | Huxley et al. |
| 6,138,150 A | 10/2000 | Nichols et al. |
| 6,148,142 A | 11/2000 | Anderson |
| 6,151,077 A | 11/2000 | Vogel et al. |
| 6,151,634 A | 11/2000 | Glaser |
| 6,154,207 A | 11/2000 | Farris et al. |
| 6,157,935 A | 12/2000 | Tran et al. |
| 6,161,059 A | 12/2000 | Tedesco et al. |
| 6,170,060 B1 | 1/2001 | Mott et al. |
| 6,173,172 B1 | 1/2001 | Masuda et al. |
| 6,175,861 B1 | 1/2001 | Williams, Jr. et al. |
| 6,182,126 B1 | 1/2001 | Nathan et al. |
| 6,185,184 B1 | 2/2001 | Mattaway et al. |
| 6,185,619 B1 | 2/2001 | Joffe et al. |
| 6,191,780 B1 | 2/2001 | Martin et al. |
| 6,192,340 B1 | 2/2001 | Abecassis |
| 6,198,408 B1 | 3/2001 | Cohen |
| 6,202,060 B1 | 3/2001 | Tran |
| 6,209,060 B1 | 3/2001 | Machida |
| 6,212,138 B1 | 4/2001 | Kalis et al. |
| 6,216,227 B1 | 4/2001 | Goldstein et al. |
| 6,219,692 B1 | 4/2001 | Stiles |
| 6,223,209 B1 | 4/2001 | Watson |
| 6,240,550 B1 | 5/2001 | Nathan et al. |
| 6,243,725 B1 | 6/2001 | Hempleman et al. |
| 6,247,022 B1 | 6/2001 | Yankowski |
| 6,256,773 B1 | 7/2001 | Bowman-Amuah |
| 6,262,569 B1 | 7/2001 | Carr et al. |
| 6,280,327 B1 | 8/2001 | Leifer et al. |
| 6,288,991 B1 | 9/2001 | Kajiyama et al. |
| 6,289,382 B1 | 9/2001 | Bowman-Amuah |
| 6,292,443 B1 | 9/2001 | Awazu et al. |
| 6,298,373 B1 | 10/2001 | Burns et al. |
| 6,302,793 B1 | 10/2001 | Fertitta et al. |
| 6,308,204 B1 | 10/2001 | Nathan et al. |
| 6,311,214 B1 | 10/2001 | Rhoads |
| 6,315,572 B1 | 11/2001 | Glaser |
| 6,323,911 B1 | 11/2001 | Schein et al. |
| 6,332,025 B2 | 12/2001 | Takahashi et al. |
| 6,336,219 B1 | 1/2002 | Nathan |
| 6,341,166 B1 | 1/2002 | Basel |
| 6,344,862 B1 | 2/2002 | Williams et al. |
| 6,346,951 B1 | 2/2002 | Mastronardi |
| 6,356,971 B1 | 3/2002 | Katz et al. |
| 6,359,661 B1 | 3/2002 | Nickum |
| 6,370,580 B2 | 4/2002 | Kriegsman |
| 6,381,575 B1 | 4/2002 | Martin et al. |
| 6,384,737 B1 | 5/2002 | Hsu et al. |
| 6,393,584 B1 | 5/2002 | McLaren et al. |
| 6,396,480 B1 | 5/2002 | Schindler et al. |
| 6,397,189 B1 | 5/2002 | Martin et al. |
| 6,407,987 B1 | 6/2002 | Abraham |
| 6,408,435 B1 | 6/2002 | Sato |
| 6,408,437 B1 | 6/2002 | Hendricks et al. |
| 6,421,651 B1 | 7/2002 | Tedesco et al. |
| 6,425,125 B1 | 7/2002 | Fries et al. |
| 6,430,537 B1 | 8/2002 | Tedesco et al. |
| 6,430,738 B1 | 8/2002 | Gross et al. |
| 6,434,678 B1 | 8/2002 | Menzel |
| 6,438,450 B1 | 8/2002 | DiLorenzo |
| 6,442,549 B1 | 8/2002 | Schneider |
| 6,446,130 B1 | 9/2002 | Grapes |
| 6,449,688 B1 | 9/2002 | Peters et al. |
| 6,470,496 B1 | 10/2002 | Kato et al. |
| 6,488,508 B2 | 12/2002 | Okamoto |
| 6,490,570 B1 | 12/2002 | Numaoka |
| 6,496,927 B1 | 12/2002 | McGrane et al. |
| 6,498,855 B1 | 12/2002 | Kokkosoulis et al. |
| 6,522,707 B1 | 2/2003 | Brandstetter et al. |
| 6,535,911 B1 | 3/2003 | Miller et al. |
| 6,538,558 B2 | 3/2003 | Sakazume et al. |
| 6,543,052 B1 | 4/2003 | Ogasawara |
| 6,544,122 B2 | 4/2003 | Araki et al. |
| 6,549,719 B2 | 4/2003 | Mankovitz |
| 6,570,507 B1 | 5/2003 | Lee et al. |
| 6,571,282 B1 | 5/2003 | Bowman-Amuah |
| 6,577,735 B1 | 6/2003 | Bharat |
| 6,578,051 B1 | 6/2003 | Mastronardi |
| 6,587,403 B1 | 7/2003 | Keller et al. |
| 6,590,838 B1 | 7/2003 | Gerlings et al. |
| 6,598,230 B1 | 7/2003 | Ballhorn |
| 6,622,307 B1 | 9/2003 | Ho |
| 6,628,939 B2 | 9/2003 | Paulsen |
| 6,629,318 B1 | 9/2003 | Radha et al. |
| 6,643,620 B1 | 11/2003 | Contolini et al. |
| 6,643,690 B2 | 11/2003 | Duursma et al. |
| 6,654,801 B2 | 11/2003 | Mann et al. |
| 6,658,090 B1 | 12/2003 | Harjunen et al. |
| 6,662,231 B1 | 12/2003 | Drosset et al. |
| 6,702,585 B2 | 3/2004 | Okamoto |
| 6,728,956 B2 | 4/2004 | Ono |
| 6,728,966 B1 | 4/2004 | Arsenault et al. |
| 6,744,882 B1 | 6/2004 | Gupta et al. |
| 6,751,794 B1 | 6/2004 | McCaleb et al. |
| 6,755,744 B1 | 6/2004 | Nathan et al. |
| 6,789,215 B1 | 9/2004 | Rupp et al. |
| 6,816,578 B1 | 11/2004 | Kredo et al. |
| 6,898,161 B1 | 5/2005 | Nathan |
| 6,904,592 B1 | 6/2005 | Johnson |
| 6,928,653 B1 | 8/2005 | Ellis et al. |
| 6,942,574 B1 | 9/2005 | LeMay et al. |
| 6,974,076 B1 | 12/2005 | Siegel |
| 7,024,485 B2 | 4/2006 | Dunning et al. |

(56) References Cited

U.S. PATENT DOCUMENTS

| | | |
|---|---|---|
| 7,107,109 B1 | 9/2006 | Nathan et al. |
| 7,124,194 B2 | 10/2006 | Nathan et al. |
| 7,188,352 B2 | 3/2007 | Nathan et al. |
| 7,195,157 B2 | 3/2007 | Swartz et al. |
| 7,198,571 B2 | 4/2007 | LeMay et al. |
| 7,206,417 B2 | 4/2007 | Nathan |
| 7,210,141 B1 | 4/2007 | Nathan et al. |
| 7,231,656 B1 | 6/2007 | Nathan |
| 7,237,198 B1 | 6/2007 | Chaney |
| 7,293,277 B1 | 11/2007 | Nathan |
| 7,356,831 B2 | 4/2008 | Nathan |
| 7,406,529 B2 | 7/2008 | Reed |
| 7,424,731 B1 | 9/2008 | Nathan et al. |
| 7,448,057 B1 | 11/2008 | Nathan |
| 7,483,958 B1 | 1/2009 | Elabbady |
| 7,500,192 B2 | 3/2009 | Mastronardi |
| 7,512,632 B2 | 3/2009 | Mastronardi et al. |
| 7,519,442 B2 | 4/2009 | Nathan et al. |
| 7,548,851 B1 | 6/2009 | Lau |
| 7,549,919 B1 | 6/2009 | Nathan et al. |
| 7,574,727 B2 | 8/2009 | Nathan et al. |
| 7,647,613 B2 | 1/2010 | Drakoulis et al. |
| 7,749,083 B2 | 7/2010 | Nathan et al. |
| 7,757,264 B2 | 7/2010 | Nathan |
| 7,783,774 B2 | 8/2010 | Nathan et al. |
| 7,793,331 B2 | 9/2010 | Nathan et al. |
| 2001/0016815 A1 | 8/2001 | Takahashi et al. |
| 2001/0023403 A1 | 9/2001 | Martin |
| 2001/0030660 A1 | 10/2001 | Zainoulline |
| 2001/0037367 A1 | 11/2001 | Iyer |
| 2001/0044725 A1 | 11/2001 | Matsuda et al. |
| 2002/0002079 A1 | 1/2002 | Martin et al. |
| 2002/0002483 A1 | 1/2002 | Siegel et al. |
| 2002/0045960 A1 | 4/2002 | Phillips |
| 2002/0113824 A1 | 8/2002 | Myers |
| 2002/0116476 A1 | 8/2002 | Eyal et al. |
| 2002/0118949 A1 | 8/2002 | Jones |
| 2002/0120925 A1 | 8/2002 | Logan |
| 2002/0129036 A1 | 9/2002 | Ho Yuen Lok et al. |
| 2002/0129371 A1 | 9/2002 | Emura et al. |
| 2002/0162104 A1 | 10/2002 | Raike et al. |
| 2003/0005099 A1 | 1/2003 | Sven et al. |
| 2003/0008703 A1 | 1/2003 | Gauselmann |
| 2003/0018740 A1 | 1/2003 | Sonoda |
| 2003/0031096 A1 | 2/2003 | Nathan et al. |
| 2003/0041093 A1 | 2/2003 | Yamane |
| 2003/0065639 A1 | 4/2003 | Fiennes |
| 2003/0088538 A1 | 5/2003 | Ballard |
| 2003/0093790 A1 | 5/2003 | Logan |
| 2003/0101450 A1 | 5/2003 | Davidsson et al. |
| 2003/0104865 A1 | 6/2003 | Itkis et al. |
| 2003/0108164 A1 | 6/2003 | Laurin |
| 2003/0135424 A1 | 7/2003 | Davis |
| 2003/0163388 A1 | 8/2003 | Beane |
| 2003/0208586 A1 | 11/2003 | Mastronardi et al. |
| 2003/0225834 A1 | 12/2003 | Lee |
| 2003/0233469 A1 | 12/2003 | Knowlson |
| 2004/0003073 A1* | 1/2004 | Krzyzanowski .... H04L 12/2803 709/223 |
| 2004/0025185 A1* | 2/2004 | Goci ............... G07F 5/18 725/92 |
| 2004/0085334 A1 | 5/2004 | Reaney |
| 2004/0103150 A1 | 5/2004 | Ogdon et al. |
| 2004/0148362 A1 | 7/2004 | Friedman |
| 2004/0204220 A1 | 10/2004 | Fried et al. |
| 2004/0205171 A1 | 10/2004 | Nathan et al. |
| 2004/0220926 A1 | 11/2004 | Lamkin et al. |
| 2004/0243482 A1* | 12/2004 | Laut ............. G06Q 30/0601 705/26.1 |
| 2005/0034084 A1 | 2/2005 | Ohtsuki |
| 2005/0060405 A1* | 3/2005 | Nathan ......... G06F 17/30017 709/225 |
| 2005/0073782 A1 | 4/2005 | Nathan |
| 2005/0086172 A1 | 4/2005 | Stefik |
| 2005/0125833 A1 | 6/2005 | Nathan et al. |
| 2005/0240661 A1 | 10/2005 | Heller et al. |
| 2005/0267819 A1 | 12/2005 | Kaplan |
| 2006/0018208 A1 | 1/2006 | Nathan et al. |
| 2006/0035707 A1 | 2/2006 | Nguyen et al. |
| 2006/0062094 A1* | 3/2006 | Nathan ............... G06Q 20/123 369/30.06 |
| 2006/0143575 A1 | 6/2006 | Sauermann |
| 2006/0239131 A1 | 10/2006 | Nathan et al. |
| 2006/0293773 A1 | 12/2006 | Nathan et al. |
| 2007/0121430 A1 | 5/2007 | Nathan |
| 2007/0142022 A1 | 6/2007 | Madonna |
| 2007/0160224 A1 | 7/2007 | Nathan |
| 2007/0204263 A1 | 8/2007 | Nathan et al. |
| 2007/0209053 A1 | 9/2007 | Nathan |
| 2007/0220580 A1 | 9/2007 | Putterman |
| 2007/0247979 A1 | 10/2007 | Brillon et al. |
| 2008/0005698 A1 | 1/2008 | Koskinen |
| 2008/0069545 A1 | 3/2008 | Nathan et al. |
| 2008/0077962 A1 | 3/2008 | Nathan |
| 2008/0086379 A1 | 4/2008 | Dion et al. |
| 2008/0096659 A1 | 4/2008 | Kreloff et al. |
| 2008/0137849 A1 | 6/2008 | Nathan |
| 2008/0168807 A1 | 7/2008 | Dion et al. |
| 2008/0171594 A1 | 7/2008 | Fedesna et al. |
| 2008/0195443 A1 | 8/2008 | Nathan et al. |
| 2008/0239887 A1 | 10/2008 | Tooker et al. |
| 2009/0006993 A1 | 1/2009 | Tuli et al. |
| 2009/0037969 A1 | 2/2009 | Nathan |
| 2009/0070341 A1 | 3/2009 | Mastronardi et al. |
| 2009/0109224 A1 | 4/2009 | Sakurai |
| 2009/0128631 A1 | 5/2009 | Ortiz |
| 2009/0138111 A1 | 5/2009 | Mastronardi |
| 2009/0158203 A1 | 6/2009 | Kerr et al. |
| 2009/0234914 A1 | 9/2009 | Mikkelsen et al. |
| 2009/0265734 A1 | 10/2009 | Dion et al. |
| 2009/0282491 A1 | 11/2009 | Nathan |
| 2010/0042505 A1 | 2/2010 | Straus |
| 2010/0111489 A1 | 5/2010 | Presler |
| 2010/0211818 A1 | 8/2010 | Nathan et al. |
| 2010/0211872 A1 | 8/2010 | Rolston |

FOREIGN PATENT DOCUMENTS

| | | |
|---|---|---|
| CN | 101019432 | 8/2007 |
| DE | 3406058 | 8/1985 |
| DE | 3723737 | 1/1988 |
| DE | 3820835 | 1/1989 |
| DE | 3815071 | 11/1989 |
| DE | 4244198 | 6/1994 |
| DE | 19610739 | 9/1997 |
| DE | 19904007 | 8/2000 |
| EP | 0082077 | 6/1983 |
| EP | 0140593 | 5/1985 |
| EP | 0256921 | 2/1988 |
| EP | 0283304 | 9/1988 |
| EP | 0283350 | 9/1988 |
| EP | 0309298 | 3/1989 |
| EP | 0313359 | 4/1989 |
| EP | 0340787 | 11/1989 |
| EP | 0363186 | 4/1990 |
| EP | 0425168 | 5/1991 |
| EP | 0464562 | 1/1992 |
| EP | 0480558 | 4/1992 |
| EP | 0498130 | 8/1992 |
| EP | 0507110 | 10/1992 |
| EP | 0529834 | 3/1993 |
| EP | 0538319 B1 | 4/1993 |
| EP | 0631283 | 12/1994 |
| EP | 0632371 | 1/1995 |
| EP | 0711076 | 5/1996 |
| EP | 0786122 B1 | 7/1997 |
| EP | 0817103 | 1/1998 |
| EP | 0841616 | 5/1998 |
| EP | 0919964 | 6/1999 |
| EP | 0959570 | 11/1999 |
| EP | 0974896 | 1/2000 |
| EP | 0974941 | 1/2000 |
| EP | 0982695 | 3/2000 |
| EP | 1001391 | 5/2000 |

(56) References Cited

FOREIGN PATENT DOCUMENTS

| | | |
|---|---|---|
| EP | 1408427 | 4/2004 |
| FR | 2602352 | 2/1988 |
| FR | 2808906 | 11/2001 |
| GB | 2122799 | 1/1984 |
| GB | 2166328 | 4/1986 |
| GB | 2170943 | 8/1986 |
| GB | 2193420 | 2/1988 |
| GB | 2238680 | 6/1991 |
| GB | 2254469 | 10/1992 |
| GB | 2259398 | 3/1993 |
| GB | 2262170 | 6/1993 |
| GB | 2380377 | 4/2003 |
| JP | 57173207 | 10/1982 |
| JP | 58-179892 | 10/1983 |
| JP | 60-253082 | 12/1985 |
| JP | 61084143 | 4/1986 |
| JP | 62-192849 | 8/1987 |
| JP | 62-284496 | 12/1987 |
| JP | 63-60634 | 3/1988 |
| JP | 2-153665 | 6/1990 |
| JP | 5-74078 | 3/1993 |
| JP | 5122282 | 5/1993 |
| JP | 07281682 | 10/1995 |
| JP | 08-279235 | 10/1996 |
| JP | 8274812 | 10/1996 |
| JP | 3034555 | 11/1996 |
| JP | 10-098344 | 4/1998 |
| JP | 2000-270314 | 9/2000 |
| JP | 2004-29459 | 1/2004 |
| JP | 2004-030469 | 1/2004 |
| JP | 2004-054435 | 2/2004 |
| JP | 2005-018438 | 1/2005 |
| JP | 2005-215209 | 8/2005 |
| JP | 2006-39704 | 2/2006 |
| JP | 2007-199775 | 8/2007 |
| JP | 2009-075540 | 4/2009 |
| JP | 2009-288702 | 12/2009 |
| WO | WO 86/01326 | 2/1986 |
| WO | WO 90/07843 | 7/1990 |
| WO | WO 91/08542 | 6/1991 |
| WO | WO 91/20082 | 12/1991 |
| WO | WO 93/16557 | 8/1993 |
| WO | WO 93/18465 | 9/1993 |
| WO | WO 94/03894 | 2/1994 |
| WO | WO 94/14273 | 6/1994 |
| WO | WO 94/15306 | 7/1994 |
| WO | WO 94/15416 | 7/1994 |
| WO | WO 95/03609 | 2/1995 |
| WO | WO 95/29537 | 11/1995 |
| WO | WO 96/12255 | 4/1996 |
| WO | WO 96/12256 | 4/1996 |
| WO | WO 96/12257 | 4/1996 |
| WO | WO 96/12258 | 4/1996 |
| WO | WO 98/07940 | 2/1998 |
| WO | WO 98/45835 | 10/1998 |
| WO | WO 01/00290 | 1/2001 |
| WO | WO 01/08148 A1 | 2/2001 |
| WO | WO 02/095752 A1 | 11/2002 |
| WO | WO 2005/052751 A2 | 6/2005 |
| WO | WO 2006/014739 A2 | 2/2006 |
| WO | WO 2006/106631 | 10/2006 |
| WO | WO 2007/069143 A2 | 6/2007 |
| WO | WO 2009/004531 A1 | 1/2009 |

OTHER PUBLICATIONS

Drews, C.; Pestoni, F.;, "Virtual jukebox: reviving a classic," System Sciences, 2002. HICSS. Proceedings of the 35th Annual Hawaii International Conference on , vol., No., pp. 887-893, Jan. 7-10, 2002 doi: 10.1109/HICSS.2002.994055 URL: http://ieeexplore.ieee.org/stamp/stamp.jsp?tp=&arnumber=994055 &isnumber=21442.*

Drews, C.; Pestoni, F.;, "Virtual jukebox: reviving a classic," System Sciences, 2002. HICSS. Proceedings of the 35th Annual Hawaii International Conference on , vol., No., pp. 887- 893, Jan. 7-10, 2002 doi: 10.1109/HICSS.2002.994055 URL: http://ieeexplore.ieee.org/stamp/stamp.jsp?tp=&arnumber=994055 &isnumber=21442.*

"Darts Revolution Again", Replay Magazine, Mar. 1991, pp. 146-148.

"Ecast Forges Landmark International Technology Partnership", Business Wire at www.findarticles.com/cf_0/m0EIN/2000_July_25/63663604/print.jhtml, 2 pages, Jul. 25, 2000.

"Ecast Selects Viant to Build Siren Entertainment System (TM)", ScreamingMedia, PR Newswire San Francisco, industry.java.sum.com/javanews/stories/story2/0,1072,17618,00.html, 3 pages, Aug. 3, 1999.

Bonczek et al, "The DSS Development System", 1983 National Computer Conference, Anaheim, California, May 16-19, 1983, pp. 441-455.

Derfler et al., "How Networks Work", Millennium Ed., Que Corporation, Jan. 2000.

European Search Report issued for European Application No. 08000845.1-1238/1962251, dated Apr. 3, 2009.

Gralla, "How the Internet Works", Millennium Ed., Que Corporation, Aug. 1999.

Grimes, Chapter 18, "Taking Advantage of Web-based Audio".

Hicks et al., "Dynamic software updating", ACM PLDI, pp. 13-23, 2001.

IBM Technical Disclosure Bulletin, vol. 30, No. 5, Oct. 1987, "Method for Automated Assembly of Software Versions", pp. 353-355.

IBM Technical Disclosure Bulletin, vol. 32, No. 9A, Feb. 1990, "Robotic Wafer Handling System for Class 10 Environments" pp. 141-143.

IBM Technical Disclosure Bulletin, vol. 33, No. 12, May 1991, "High-speed Opens and Shorts Substrate Tester", pp. 251-259.

iTouch 27 New Games brochure, JVL Corporation, 2005, 2 pages.

iTouch 8 Plus brochure, JVL Corporation, 2005, 2 pages.

Koskelainem, "Report on Streamworks™".

Kozierok, The PC Guide, Site Version 2.2.0, http://www.pcguide.com, Apr. 17, 2001.

Liang et al., "Dynamic class loading in the Java virtual machine", ACM OOPSLA, pp. 36-44, 1998.

Look and iTouch brochure, JVL Corporation, 2004, 2 pages.

Megatouch Champ brochure, Merit Industries, Inc., 2005, 2 pages.

Melnik et al., "A mediation infrastructure for digital library services", ACM DL, pp. 123-132, 2000.

Mod Box Internet brochure, Merit Entertainment, 2006, 2 pages.

Newsome et al., "Proxy compilation of dynamically loaded java classes with MoJo", ACM LCTES, pp. 204-212, 2002.

Outlaw, Computer Technology Review, "Virtual Servers Offer Performance Benefits for Network Imaging", 1993.

Patent Abstract of Japan vol. 95, No. 010 & JP 07 281682 A (Naguo Yuasa), 27 October 1 JP 07 281682, figure 1-6 abrége.

Schneier, "Applied Cryptography", Second Edition, John Wiley & Sons, Inc. New York, 1996.

Stevens, "TCP/IP Illustrated: vol. 1, The Protocols".

Vortex Brochure, JVL Corporation, 2005, 2 pages.

Waingrow, "Unix Hints & Hacks", Que Corporation, Indianapolis, IN, 1999.

White, "How Computers Work", Millennium Ed., Que Corporation, Indianapolis, IN, Sep. 1999 (Sep. 22, 1999).

Office Action in related U.S. Appl. No. 12/929,466 dated Apr. 14, 2016.

Office Action in related U.S. Appl. No. 11/902,658 dated Jun. 29, 2016.

Examiner's Report in related Canadian Application No. 2,881,503 dated Mar. 17, 2016.

European Examination Report dated Aug. 17, 2016 in European Appln No. 12 075 107.8.

Japanese Office Action in JP Appln. No. 2015-165266 dated Oct. 18, 2016.

(56) References Cited

OTHER PUBLICATIONS

Canadian Office Action Application No. 2,881,533 dated Aug. 30, 2016.

* cited by examiner

JUKEBOX WITH ASSOCIATED VIDEO SERVER

CROSS-REFERENCES TO RELATED APPLICATIONS

This application claims the benefit of provisional patent application Ser. No. 60/907,212, filed Mar. 26, 2007, the entire contents of which is hereby incorporated herein by reference. This application also is related to application Ser. No. 11/358,721, filed Feb. 22, 2006, which is a continuation in part of application Ser. No. 11/222,036, filed Sep. 9, 2005, which is a continuation in part of application Ser. No. 11/185,974, filed Jul. 21, 2005, which is a continuation in part of application Ser. No. 10/661,811, filed Sep. 15, 2003, which claims priority on provisional patent application Ser. No. 60/410,832, filed Sep. 16, 2002, entitled "Digital Downloading Jukebox System With Central And Local Music Servers," the entire contents of each of which are hereby incorporated herein by reference.

FIELD

The example embodiments described herein relate to, for example, jukebox systems and, more particularly, to digital downloading jukebox systems of the type that typically include a central server and remote jukebox devices that communicate with the central server for royalty accounting and/or content updates and, still more particularly, to jukebox systems that have associated video servers for displaying video content on one or more displays or groups of displays external to the jukebox and/or directly on the jukebox.

BACKGROUND AND SUMMARY

Jukeboxes have been around for decades and provide users with the ability to select desired music for reproduction in a convenient and advantageous manner. Jukeboxes conventionally have been provided in commercial establishments, such as restaurants and bars, to provide desired music on demand for patrons thereof for a fee. Over the last several years, a new generation of jukebox devices have become available that provide significant improvements in the operation thereof for all parties involved. More specifically, the conventional standalone phonorecord and CD jukeboxes are being replaced by digital downloading jukeboxes that are controlled by and communicate with a central server. An example of this new generation jukebox system is shown in U.S. Pat. No. 6,308,204, the entire disclosure of which is incorporated herein by reference. A leading provider of this new generation of jukebox systems is TouchTunes Music Corporation.

FIG. 1 shows an overview of an exemplary embodiment of a digital downloading jukebox system 10 (hereinafter referred to simply as a "jukebox system"). As shown in FIG. 1, the jukebox system 10 includes a central server 12 that contains a master library of audio content (typically music), as well as or alternatively audiovisual content (typically music and associated video or graphics), that can be downloaded therefrom. The jukebox system also includes a series of remote jukebox devices 16, 16a-16f. Each of these jukebox devices generally are located in a bar, restaurant, club, or other desired location, and are operable to play music in response to receiving a payment from a user, such as coins, bills, credit/debit card, etc., and having one or more songs selected by the user for play. In an alternative embodiment, a music service is paid for on a subscription basis by the location, and the selected music is free for the end-user. The jukebox device 16 typically includes a screen 18 that presents information to the user and allows the user to select songs therefrom, as well as an audio system 20 that plays the selected songs. The screen 18 also may be used for displaying song-related video or graphics. The screen 18 also may be used to display advertisements for the jukebox itself to attract customers thereto, to display other types of advertisements, and/or to display any other desired information.

The jukebox devices 16 (sometimes referred to as simply "jukeboxes" herein) are operable to communicate with the central server 12 through a communications network 14, such as, for example, the Internet. The jukeboxes 16 periodically communicate with the server 12 to provide information to the server 12 regarding the specific songs that have been played on the jukebox. The central server then uses this information to determine the appropriate royalties and/or other payments that are owed for songs played on each jukebox. Thus, one advantage of this new generation of jukeboxes is that the sound reproduction and/or other applicable music rights can be adhered to in a more accurate and reliable manner, thereby assuring the proper royalties are paid to the artists or music owners. The central server 12 also can provide new songs to the jukebox 16 to assure that the appropriate or most popular songs are maintained on the jukebox based on the specific customers at that location. Thus, the songs available on each jukebox can be customized through communication with the central server to provide the songs and/or types of music that customers generally request at each jukebox location. As described in the above-referenced U.S. Pat. No. 6,308,204, the central server also advantageously can be used to update the operating software on the jukeboxes in order to, for example, change the operation of the jukebox, such as to provide new or improved features. Thus, another advantage of this new generation of jukeboxes is that the songs (or other audio and/or visual content), and the operation of the jukebox itself can be remotely changed as desired, thereby reducing the need to have someone (such as a routeman) personally service the jukebox. Instead, such updates can be done using the central server 12.

As indicated above, the jukebox devices 16 each include a mass storage device, such as a hard drive, which stores the songs and associated video/graphics data (if any), as well as any other desired graphical information for reproduction on the jukebox. The mass storage device of the jukebox typically has limited storage capacity relative to the storage device of the central server 12. As a result, only a fraction of the songs stored on the central server typically are stored on the mass storage device of the jukebox at any one time. There may be other reasons as well, such as for security of the data or limited room in the jukebox itself, for having limited storage capacity on the jukebox and/or limiting the number of songs stored thereon. For example, physical space may be limited on wall-mount jukeboxes or the like, which are designed to be small in size as compared to free-standing models. As explained above, the songs on the jukebox can be changed through communication with the central server, but typically any one jukebox only stores a relatively small subset of the complete library of songs maintained by the central server at any one time.

To increase the revenue that a jukebox generates, the most desired songs may be made available on the jukebox over time. If customers cannot find songs they like on the jukebox, usage of the jukebox (and the revenue generated thereby) may be reduced. On the other hand, it is difficult to predict in advance exactly what a customer at any particular location will desire to play on the jukebox. In fact, there are likely many instances where a customer would have selected a song that exists on the central server but is not currently present on the jukebox. As a result, the jukebox may not be enjoyed and used to its fullest extent. To address this problem and increase revenue, jukebox systems have in the past provided a feature that enables the user to search for songs on the central server from the jukebox and request an immediate download of a desired song from the central server to the jukebox for an additional fee. This feature enables the user to play any song in the master library of songs maintained by the central server using the jukebox, regardless of whether the specific song is presently stored in the mass storage of the jukebox itself. Thus, the user can first look for desired songs on the local storage of the jukebox and then, if desired, search further on the central server for desired songs. The jukebox device typically charges an additional fee (such as five credits instead on one credit) for an immediate download and play of a song from the central server as opposed to a standard play directly from the jukebox's local storage.

For most users, a relationship with a jukebox extends only as far as a choice of songs to play. Casual users may find it difficult to make selections rapidly and/or to locate specific songs. Regular users, however, frequently choose the same songs, and they may become frustrated with always having to make the same selections. Both problems may result in a loss of revenue from intimidation, frustration, etc.

Accordingly, it is a feature of certain exemplary embodiments to create a relationship between the jukebox and the patrons, in view of the further feature of creating a relationship with a whole community of jukebox users. Such a system can establish a trust relationship between the jukebox and the patrons, while also creating a sense of ownership for the patrons by allowing them to customize their services and communicate with their friends. Such a relationship and feeling of ownership can greatly increase the convenience of using a jukebox and its related services while also decreasing intimidation, frustration, etc.

In certain exemplary embodiments described herein, the jukebox can be made the centerpiece for music services as well as other services that enhance the experience of users as well as the revenues of location managers. For example, a jukebox can become a contact point at a given location through which users can reach out to their friends. For instance, users may call a get together using the jukebox, share music through the jukebox system, or meet up at a jukebox if they become separated at a crowded club. Similarly, a jukebox can become, for example, a contact point at a given location through which the manager of the location can reach out to customers. For instance, a manager can advertise specials, notify regulars of special events, etc. Such communications can be initiated by users, by location managers, or by the jukebox itself.

When jukebox users leave a location, their connection to the music, and, more particularly, the jukebox itself, typically ends. Users provide massive amounts of data to the jukeboxes, such as, for example, which users like certain types of music or certain songs, when they listen to music, how frequently they listen to it, etc. With conventional jukeboxes, this information is not leveraged to provide additional features and/or services to interested users. Thus, collected information typically is wasted, and users experience only a fleeting sense of ownership. Users cannot, for example, recreate the experience of a particular night out.

Proprietors also lose out, because their connection to jukebox users disappears when users leave their establishments. Thus, proprietors lose customers until they return and are forced to rely on traditional, often ignored, methods of bulk advertisement. This form of advertising typically lacks specificity and does not reflect a personalized sense of belonging for users. Additionally, proprietors also cannot recreate specific events at which, for example, they had a particularly profitable nights.

Online communities typically, for example, on the Internet, have sprung-up to try to connect disparate users in a virtual space. These communities provide potentially continuous access to a broad range of features and users alike. However, conventional online communities are virtual only—when a user steps away from a computer, the connection, quite literally, is broken. Thus, while users may access this broad host of features and customize their experiences and even build an online persona complete with, for example, buying and viewing habits, the experience is fleeting.

By connecting jukebox users through an online community, however, the information provided to the jukebox can be used to provide a variety of features and services to the users. And, because jukeboxes are present at thousands of meeting points, connections exist at thousands of physical locations apart from the online virtual community. Thus, by leveraging the data collected by jukeboxes and tying users to an online community, a mixed real-and-virtual community may be established, for example, creating a lasting sense of ownership, personalizing services for potentially all users, drawing users together, establishing a vibrant socially active community of users connected by music, etc. Proprietors may similarly benefit by, for example, achieving a pipeline to additional business by connecting with customers while they are away from their locations, thus drawing them to their locations, etc.

Thus, a jukebox with an associated remote application can, for example, change users' perceptions of jukeboxes. Jukeboxes need not be stand-alone devices accessible only at bars. Rather, certain exemplary embodiments allow users to consider jukeboxes as, for example, media centers, meeting points, portals to online communities, etc. Moreover, with the advent of web-enabled portable devices (such as, for example, cell phones, personal digital assistants, etc.), users even can take the virtual community with them wherever they go. Users potentially may use portable devices to directly download music at any time, such as, for example, when they hear a song at home, in the car, at a bar, etc.

In certain exemplary embodiments, users' actions on jukeboxes and/or via remote interfaces may be represented by avatars specific to and/or customizable by the user. Jukeboxes may include avatar action programmed logic circuitry (e.g., any appropriate combination of hardware, software, or the like) to take actions on behalf of and/or represent the actions of the user. Such actions may include introducing songs with audio and/or video, singing and/or dancing along with music, marking online transactions (e.g., messages, postings, file transfers, etc.), etc. As such, user avatars may yet further increase senses of ownership and/or belonging, drawing users to jukeboxes. Moreover, avatars may further increase the enjoyment of the individual user, regular patrons, and/or newcomers to an area.

Although these features all have contributed to increased senses of ownership and personalization of jukeboxes, further improvements still could be made. In particular, it has been determined that jukebox users need more than music videos playing along with the audio to have a truly unique and interactive experience. Accordingly, certain exemplary embodiments of this invention provide further improvements in the form of and/or to promote jukebox interactivity. For example, overhead videos may include segment programming, which tends to be more engaging than digital signage, and they such programming may be integrated into the entertainment experience built around the jukebox zone. As a further improvement, video segments may be sequenced in a manner that frequently engages the viewer to review, respond, and recall elements of the material presented. As such, the video content may be able to complement and/or further enhance the interactive experience that jukeboxes currently provide, while also enabling patrons not directly in front of the jukebox to participate in the interactive process. In addition to creating a compelling entertainment experience for patrons, it also is possible to create new revenue opportunities for customers. For example, operators and national account customers and advertising partners may provide additional value to venues through the innovative use of managed video content.

Accordingly, it will be appreciated that there is a need for systems and/or methods of enhancing the interactivity of jukebox-related experiences.

In certain exemplary embodiments, a digital jukebox device is provided. A display is configured to display jukebox-related video content. A first storage location stores a plurality of instances of audio content for playback by the jukebox device. A payment accepter accepts payment to enable playback of the instances of audio content by the jukebox device. A processor is configured to instruct a video server in communication with the jukebox device to reproduce, on one or more displays or groups of displays remote from the jukebox that are each operably connected to the video server, video content stored on a second storage location accessible by the video server. The video server is configured to coordinate playback of video content on the one or more displays or groups of displays. The video server is further configured to access the video content stored on the second storage location independent of the first storage location of the jukebox device. The coordinated playback is substantially offloaded from the processor of the jukebox device and the first storage location to the video server.

In certain exemplary embodiments, a digital audiovisual distribution network is provided. A central store of instances of audio content is provided. A plurality of digital jukebox devices respectively located at a plurality of locations is provided. Each said digital jukebox device comprises a display configured to display jukebox-related video content; a first storage location storing a plurality of instances of audio content for playback by the jukebox device; a payment accepter for accepting payment to enable playback of the instances of audio content by the jukebox device; and a processor configured to instruct a video server in communication with the jukebox device to reproduce, on one or more displays or groups of displays remote from the jukebox that are each operably connected to the video server, video content stored on a second storage location accessible by the video server. The video server is configured to coordinate playback of video content on the one or more displays or groups of displays, and is further configured to access the video content stored on the second storage location independent of the first storage location of the jukebox device. The coordinated playback is substantially offloaded from the processor of the jukebox device and the first storage location to the video server.

In certain exemplary embodiments, a method of operating a digital jukebox device is provided. Jukebox-related video content is displayed on a display of the digital jukebox device. Playback is enabled, by the jukebox device, for a plurality of instances of audio content stored on a first storage location of the jukebox device. Payment is accepted, via a payment accepter, to enable playback of the instances of audio content by the jukebox device. Via a processor of the jukebox device, a video server in communication with the jukebox device is instructed to reproduce, on one or more displays or groups of displays remote from the jukebox that are each operably connected to the video server, video content stored on a second storage location accessible by the video server. Playback of video content is coordinated via the video server on the one or more displays or groups of displays, such that the video server accesses the video content stored on the second storage location independent of the first storage location of the jukebox device, the coordinated playback being substantially offloaded from the processor of the jukebox device and the first storage location to the video server.

Certain exemplary embodiments may be implemented as any suitable combination of programmed logic circuitry (e.g., hardware, software, firmware, and/or the like). For example, the processors, modules, graphical user interfaces, etc. of certain exemplary embodiments may be implemented as any suitable combination of programmed logic circuitry. Additionally, certain exemplary embodiments may be tangibly stored as instructions on a computer readable storage medium.

BRIEF DESCRIPTION OF THE DRAWINGS

These and other features, aspects, and advantages of the instant invention will be further understood by review of the following detailed description of the exemplary embodiments when read in conjunction with the appended drawings, in which:

FIG. 9 is a flowchart showing an exemplary process for a priority play queue with prioritization-based-on-bidding capability;

DETAILED DESCRIPTION

Figure 1:
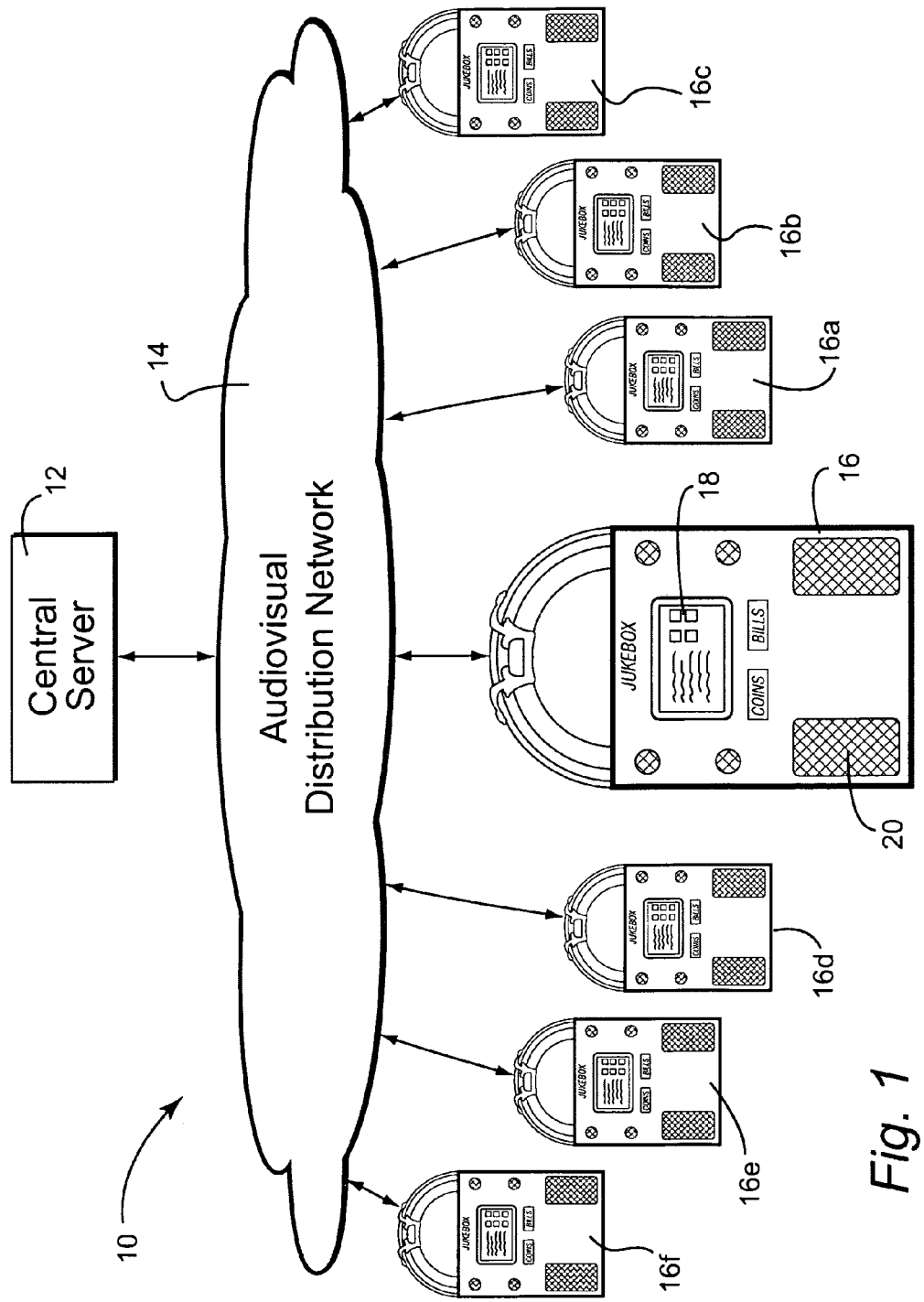
FIG. 1 is a block diagram of a conventional downloading digital jukebox system.
Figure 2:
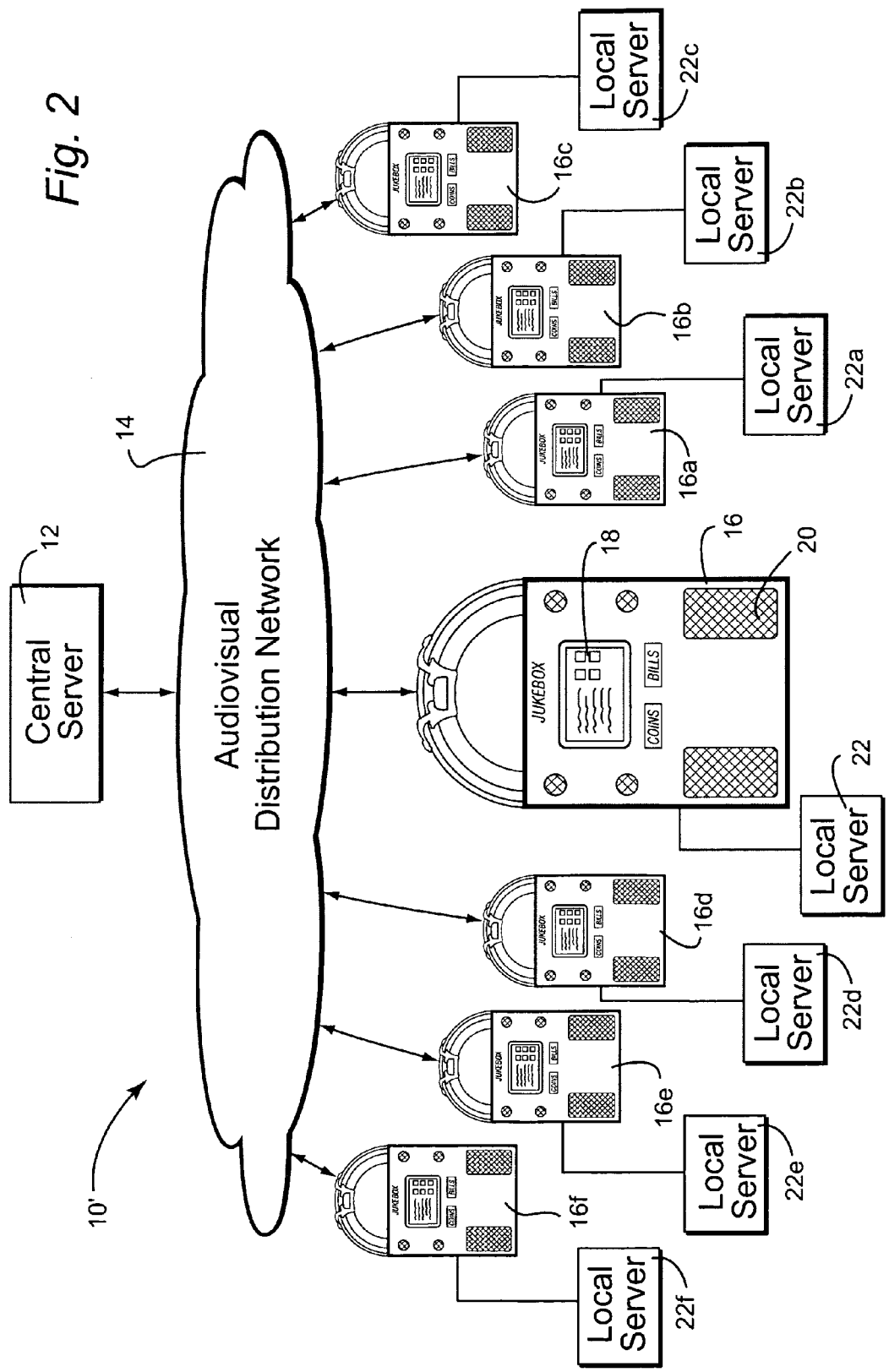
FIG. 2 is a block diagram of an improved downloading digital jukebox system in accordance with an exemplary embodiment.

Referring now more particularly to the drawings, FIG. 2 shows a block diagram of an exemplary embodiment of an improved jukebox system 10'. The jukebox system 10' includes similar elements as shown in FIG. 1 and described above, including a central server 12, communications network 14, and remote jukebox devices 16, 16a-16f. However, the jukebox system 10' further includes local servers 22, 22a-22f respectively connected to each of the jukebox devices 16, 16a-16f. The central server 12 includes a master library of songs (and/or other content). Each of the jukebox devices includes a subset of the master library on a local storage device of the jukebox. The central server may be used to individually manage the contents of the jukebox device, by monitoring usage of and updating the subset of songs on each of the jukebox devices with the intent of maximizing the usage thereof. The central server 12 periodically receives data from each of the jukeboxes for the purpose of royalty accounting and payment for songs played. The jukebox devices may connect to the network in any suitable manner, such as dial-up modem or broadband modem (e.g., DSL, cable, wireless broadband, or satellite). The communications network 14 may be any suitable network capable of distributing data (e.g., audiovisual data) from the central server 12 to the jukeboxes 16 and enabling data to be uploaded from the jukeboxes 16 to the central server 12.

The songs (and/or other data). may be digitized, compressed, and encrypted by the central server 12 prior to sending songs to the jukeboxes for security and bandwidth purposes using known techniques. The songs may then be decompressed and decrypted by the jukeboxes for storage and reproduction thereon. Thus, each of the jukeboxes can maintain in a database a library of digitized songs for play on the jukebox, wherein the library can be changed or updated through communication by the central server. The jukeboxes also may receive and store data constituting images (e.g., still and/or moving video and/or graphical images) that can be displayed on the display 18 of the jukebox device 16. In one exemplary embodiment, the jukebox devices have similar structure and operation described in U.S. Pat. No. 6,308,204 referenced above. Thus, the jukebox devices 16 each may include one or more microprocessors, such as a main CPU and an audio DSP, a memory, such as a hard drive, for storing songs and/or other content, a display for displaying visual items, an audio arrangement 20 for providing audio, a communication system for enabling the jukebox to communicate with the central server 12 through the communications network 14, and operating software, possibly including a multitasking operating system, that controls the operation of the jukebox. The operating software also may be updateable through communication with the central server 12 as described, for example, in U.S. Pat. No. 6,308,204 referenced above. The jukeboxes 16 further include one or more payment devices, such as coin, bill, and/or credit/debit card input devices, for enabling a customer to pay for usage of the jukebox device in a convenient manner. The screen 18 is a touch screen that enables the user to input selections by touching the screen.

Each jukebox device has, in one exemplary embodiment, a local server 22 that can be accessed by the jukebox device. The local servers are respectively connected to the jukebox devices using Ethernet or other type of local connection. In another exemplary embodiment, the local server simply may be a logical extension (e.g., partition, directory, or area) of the jukebox's hard drive, rather than a separate hardware device. The local servers 22 each may include a mirror copy of the master library of musical recordings maintained by the central server 12. The local server 22 can be loaded with the master library by the entity that owns and/or controls the jukebox network prior to shipping the local server and jukebox device to the jukebox. distributor or operator. Of course, over time, the local sever will no longer correspond identically to the central server, because of the fact that the central server may be continually updated with additional or new songs. Thus, the local servers 22 also may be updated periodically to maintain a correspondence with the library on the central server 12. This updating can be done, for example, by the central server 12 through communication with the jukebox devices connected with the local servers 22 using, for example, either dial-up or broadband modems. Alternatively, the updating can be done personally with an update tool that can be connected by a routeman or other person directly to the jukebox or local server for the purpose of updating the contents of the local server. The portable tool could include a removable storage medium, such as a hard drive, that could be returned to and reused by the owner of the jukebox system for future updates. The tool itself could be kept by the operator or other person in charge of maintaining specific jukeboxes for use upon receipt of the updated removable storage medium from the owner of the jukebox system.

For security reasons, the local server 22 may not include all of the digital data that constitutes any one song that is stored on the local server 22. In addition, the part of the song that is on the local server is encrypted. The jukebox device 16 contains the missing part of each of the songs on the local server, thereby enabling the jukebox to assemble the complete song based on the contents of the local server and the memory on the jukebox device. The missing data located on the jukebox may be needed to decrypt the songs, for example. For example, a single block (or other small fraction) of data for each song may be missing on the local server but present on the jukebox device, and the encryption may be based on the missing block and may proceed on a block by block basis. Thus, none of the blocks can be decrypted without obtaining and/or decrypting a preceding block. This feature provides significant security and prevents or deters theft or other type of unauthorized use or copying of the songs on the local server. Thus, in this embodiment, each local server must be specifically assigned to a specific jukebox device so that the decryption described above can be properly performed.

In accordance with an exemplary embodiment, the local servers may also each be individually registered with and identified to the central server 12, so that the central server can individually manage and monitor each local server. The same is true for the jukebox device itself, e.g., it may also be registered with the central server so that it too can be individually monitored and managed by the central server. As will be understood from the foregoing description, the local servers become an advantageous part of the jukebox system by allowing the contents thereof to be accessed by the jukebox device to provide additional services (such as providing additional songs) not available on the jukebox device itself. As will be explained below, the song library of the central server and/or the storage capacity itself can be advantageously used to provide services to other jukeboxes, such as fee-based residential and commercial jukeboxes and/or other fee-based equipment.

Figure 3:
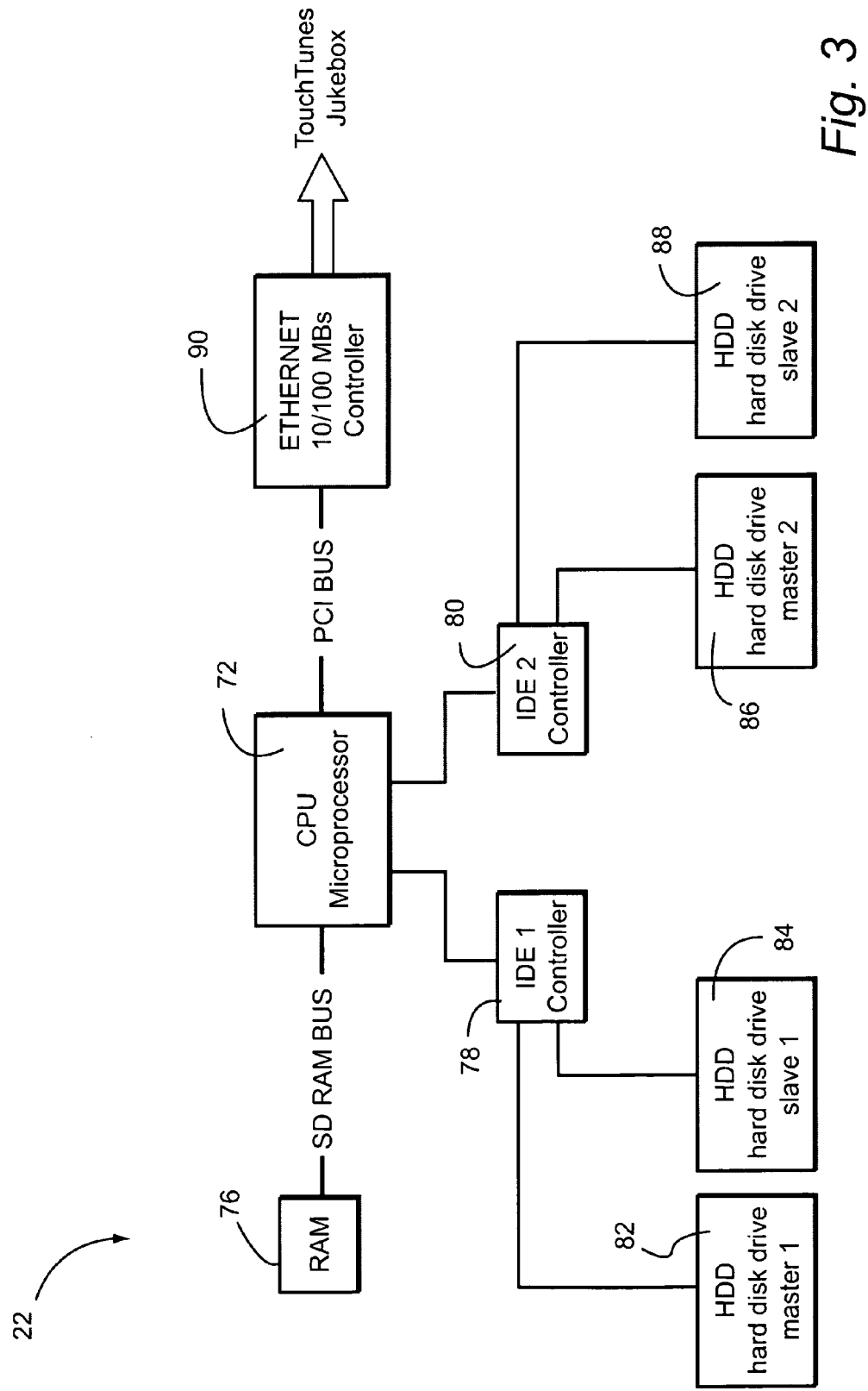
FIG. 3 shows a block diagram of an exemplary embodiment of the local sever.

FIG. 3 shows a block diagram of the electronic elements that define the local server 22 in accordance with an exemplary embodiment. As shown in FIG. 3, the local server 22 includes a CPU 72, a memory (e.g., a flash memory) containing the BIOS and OS, a pair of master/slave hard drives (82, 84 and 86, 88, respectively), a pair of IDE controllers 78 and 80 for the hard drive pairs respectively, a RAM 76, an Ethernet controller for controlling communication with the jukebox device 16, and the appropriate buses interconnecting the various elements. Of course, other configurations or arrangements for the local server 22 may be used. A unique identifier may be provided in the local server for enabling the local server to be uniquely identified and registered by the jukebox and/or central server. The identifier may, for example, be located in the flash memory 74.

As will be appreciated from the description of the invention above, the addition of the local server significantly enhances the operation of the jukebox devices that are part of a jukebox system. However, the local servers also provide other benefits and features.

A collection of local servers 22 may be used as a network of distributed servers that can be controlled by the central server 12 through its associated jukebox device 16 to provide music services to other devices. For example, the local servers and associated jukebox can be used to deliver requested songs to a dedicated residential or commercial jukebox device (or other suitable jukebox device) in addition to providing song services to the specific jukebox to which it is connected and assigned. Thus, the network of distributed servers can provide a support network for implementing residential and commercial jukeboxes of the type which allow a user to download songs for reproduction and/or storage at a residential or commercial location for an appropriate fee. As a result, the jukebox system operator can provide and control commercial jukeboxes and well as residential jukeboxes through the jukebox system. In one exemplary embodiment, the jukebox device and/or local server are connected to the Internet (or other suitable network) using a broadband modem and is provided with software that can selectively deliver song files to any dedicated residential jukebox device (also connectable to the Internet) under control of the central server. The central server receives requests from a residential jukebox and, by analyzing traffic on the network, provides instructions to a selected jukebox device to download the requested song file (either from its memory or from the local server) to the residential jukebox for a fee or under a subscription plan for the residential jukebox. In certain exemplary embodiments, requested songs may be streamed to a jukebox. It will be appreciated that streamed media may originate at a dedicated server, a network of streaming servers, from a jukebox or jukeboxes (such as peer-to-peer or multipeer downloading), etc.

In accordance with another exemplary aspect of the invention, the local server and jukebox device are used, under control of the central server, to provide management services for other types of coin operated or payment triggered equipment, such as gaming devices, installed in the same location as (or in close proximity to) the jukebox. In other words, the jukebox system may be used to update the functionality of and/or manage other downloading devices present in the same location. As a result, the jukebox becomes a "central hub" for all downloading equipment in a location. This feature is achieved, in one exemplary embodiment, by networking all of the downloading devices in a single location together with the jukebox and local file server. The central server can then download information to the local server together with instructions to the jukebox as to which devices should updated with what data and/or software. The jukebox device and central server can also be used to collect information from the other downloading devices to which it is managing and upload that information to the central server for reporting/accounting purposes. Thus, the owner/operator of the jukebox system can act as a third party service provider to other coin-op companies for the purpose of managing and/or updating their equipment.

The large amounts of memory provided by the local servers and the fact that they are provided and accessible at thousands of locations over a well controlled network, turns the jukebox system into a powerful tool that can be used to perform a variety of functions in the coin-op industry. More and more coin-op manufacturers are going towards games that are software upgradeable through their internal hard drives. These updates are done periodically, but as these devices increase there will be an ever increasing need for a system that can reliably and efficiently perform the updates from a remote location. The jukebox system described herein satisfies this need by enabling suitable electronic coin-op devices at a jukebox location to be managed by the central server using the jukebox and local server at the location. The central server can download software or data updates, store them on the local server and then dispatch the updates to the intended units of equipment in the establishment. Thus, the jukebox system can act as a third party service provider to other companies in the coin-op business, thereby enhancing the functionality of the jukebox system.

As explained above, the local server enables songs to be downloaded to a commercial jukebox to which it is assigned or to residential jukeboxes under control of the central server. In addition, the local servers can be used for an on-premise networked application which manages other coin-op devices. These various features of the instant invention are illustrated in FIG. 4.

Figure 4:
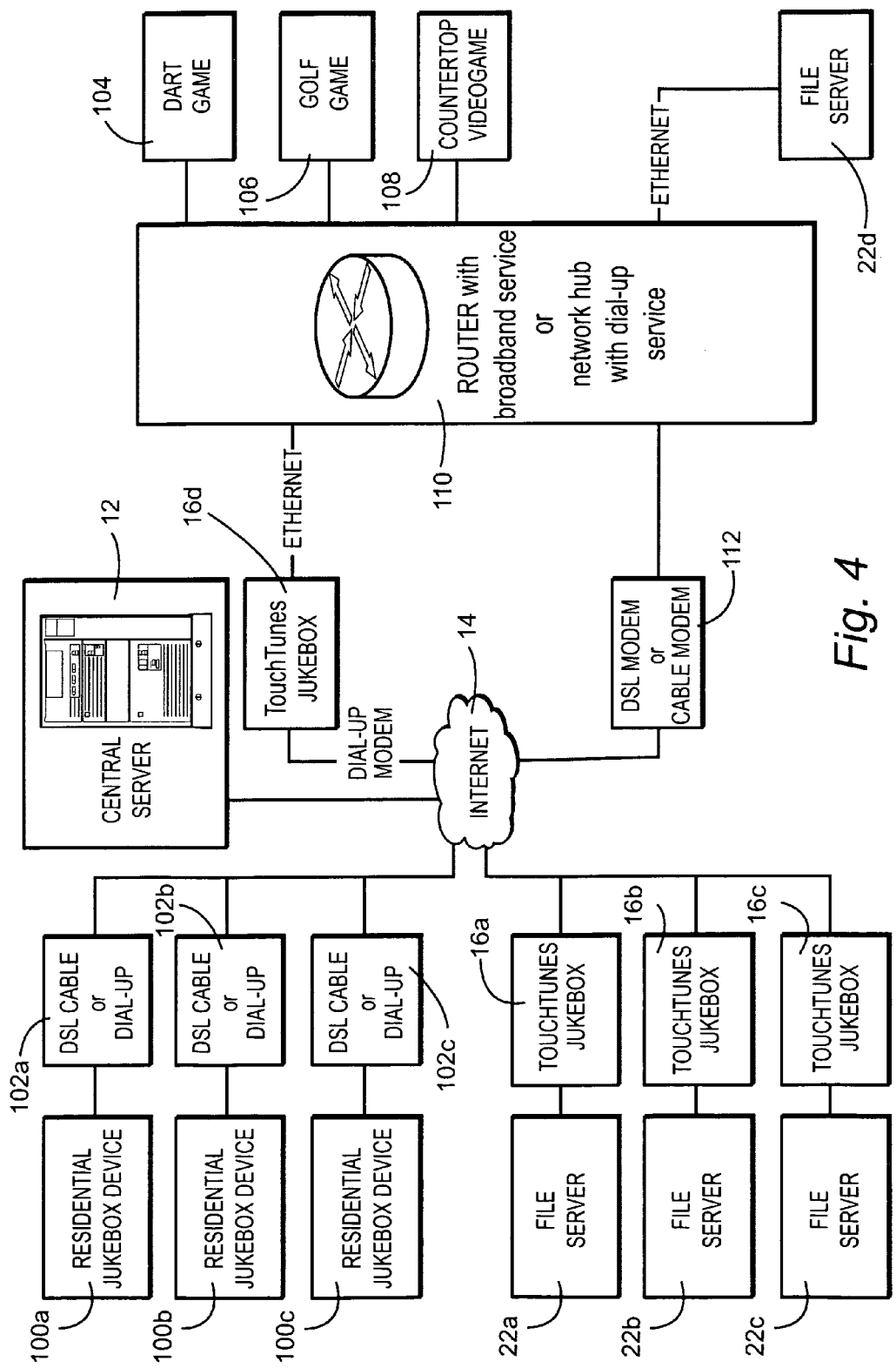
FIG. 4 shows a block diagram of an exemplary overall network including commercial jukeboxes and residential jukeboxes, as well as other downloading devices and associated connections that are managed by the jukebox system.

FIG. 4 shows a block diagram of a complete jukebox system network as contemplated by an exemplary embodiment. As explained above, the system includes a central server 12 connected to a communications network 14, a series of commercial jukeboxes 16a, 16b, and 16c with associated local music file servers 22a, 22b and 22c, a series of residential jukeboxes 100a, 100b, and 100c connected to the network via broadband devices 102a, 102b, and 102c, and an on-premises network shown on the right hand side of FIG. 4. This on-premises network includes a jukebox device 16d connected via a router or network hub 110 to a local file server 22d, a number of additional coin-op equipment, such as a dart game 104, a golf game 106, and a countertop videogame 108, and a broadband modem 112 connecting this local network to the communications network 14. With this exemplary configuration as shown in FIG. 4 all of the functionality described herein can be implemented through the jukebox system of the instant invention.

Figure 5:
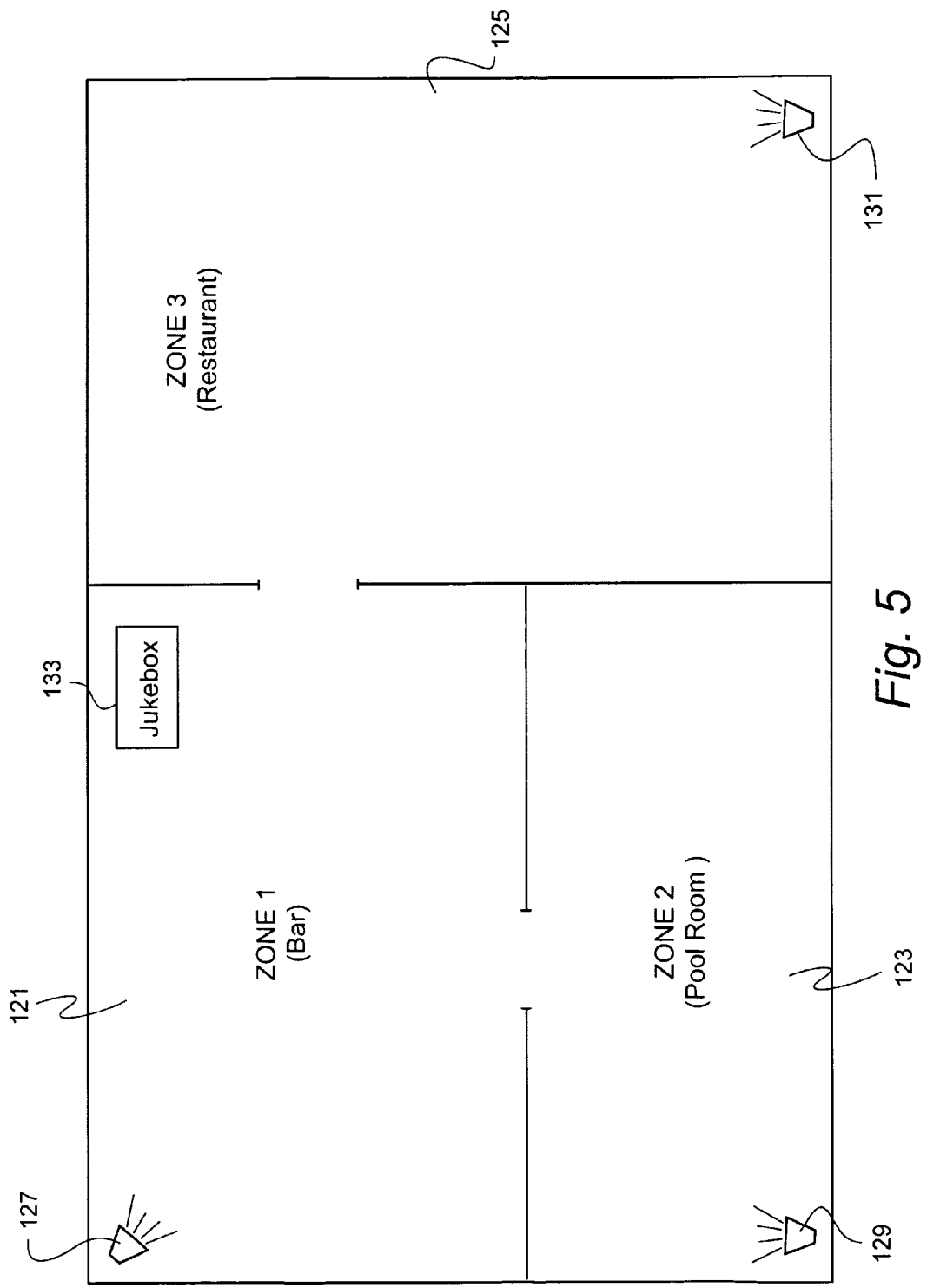
FIG. 5 shows an overhead view of an exemplary establishment layout for a multi-zone jukebox system.

FIG. 5 shows an overhead view of an exemplary establishment layout for a multi-zone jukebox system, in accordance with one exemplary embodiment of the invention. In accordance with an exemplary embodiment, the establishment has three zones 121, 123, 125. Each zone is equipped with its own set of speakers 127, 129, 131, which are operably connected to the jukebox 133. Different music may be played simultaneously in all three zones 121, 123, 125, and all the music may be played from a single jukebox 133. The jukebox 133 may be provided with additional hardware, as needed, to allow for this implementation.

Alternatively, the user may elect to have a song played in more than one of the zones 121, 123, 125 simultaneously, or in more than one of the zones at different times. The user may have to pay additional credits to implement either of these features. An exemplary embodiment of a multi-zone system could play music at a high quality in the different zones using the system described in application Ser. No. 11/023,390, filed Dec. 29, 2004, entitled "Wireless Digital Transmission System for Loudspeakers," which is a continuation in part of Ser. No. 09/161,584, filed on Sep. 28, 1998. The entire contents of both applications is incorporated herein by reference. Using this system, for example, a jukebox could compress and transmit audio data through AC power lines to an addressable location, where it could be received, decompressed, converted, and played. In fact, any of the jukebox components herein could be implemented in a manner that uses AC power lines as a communication network for operation.

It will be appreciated that the Wireless Digital Transmission System can be used for other purposes in other embodiments where data needs to be sent between two or more devices. For example, this system could be used to configure dummy terminals. In such an embodiment, the Wireless Digital Transmission System could be used to send information such as, for example, whether to morph, what songs are appropriate given a particular morphing of the jukebox, the zones in which selected music should be played, maximum volume levels, etc, in addition to sending music to the speaker systems.

The operator may also restrict what kind of music is available in a given zone, based on the type of activity in the zone, the time of day, or any other suitable selection criteria. For example, in FIG. 5, zone three 125 is a restaurant. Restaurant patrons may not wish to listen to the same type of music as someone in zone one 121, which is a bar room in FIG. 5, or in zone two 123, which is a pool room. The operator may recognize this and restrict the type of music that can be played in zone three 125. Alternatively, the operator may restrict the volume of the music in any given zone. For example, patrons of a pool room 123 or a restaurant section 125 may not want the music as loud as it is desired to be in the bar room 121. And maybe the restaurant section 121 is to be kept quieter even than the pool room 123. The owner can adjust and control all suitable settings to provide the most versatile, patron friendly environment in each of the zones, based on any suitable criteria.

Figure 6:
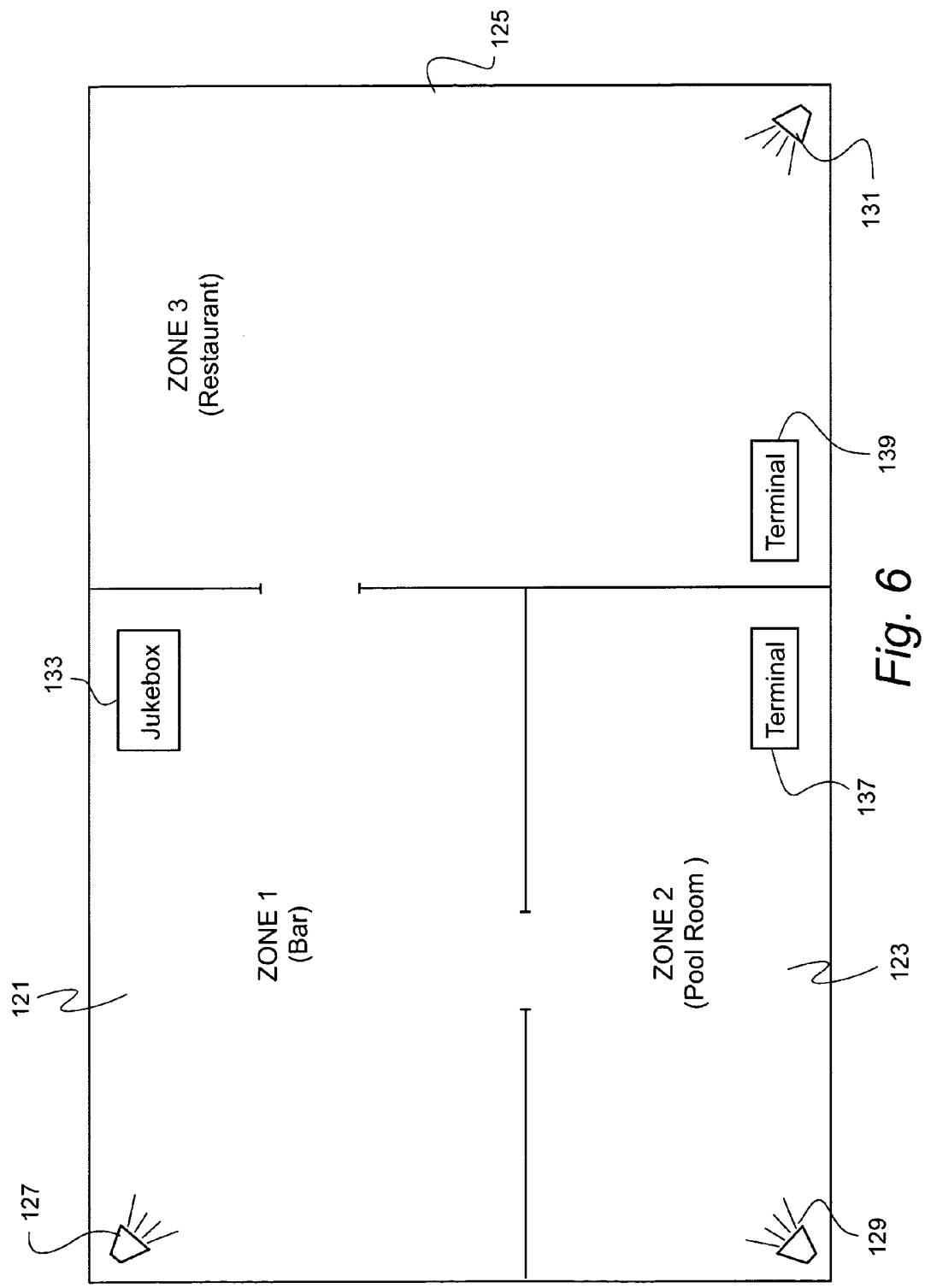
FIG. 6 shows an overhead view of an exemplary establishment layout for a multi-zone jukebox system with selection terminals in each zone.

FIG. 6 shows an overhead view of an exemplary establishment layout for a multi-zone jukebox system with selection terminals in each zone. In accordance with an exemplary embodiment, the bar has three zones 121, 123, 125. Each zone is equipped with its own set of speakers 127, 129, 131, which are operably connected to the jukebox 133. Different music may be played simultaneously in all three zones 121, 123, 125 and all the music may be played from a single jukebox 133. The jukebox 133 may be provided with additional hardware to allow this implementation.

In the exemplary embodiment of FIG. 6 there are also one or more "dummy" terminals 137, 139 located throughout the establishment. An exemplary illustrative dummy terminal could use X-server technology. These terminals 137, 139, which may be stand alone devices or may be provided as part of the interface on a gaming machine or other suitable device with a digital display, allow selection of songs from the jukebox 133 for the zone in which they are located (or possibly other zones). These terminals 137, 139 duplicate the zone restrictions imposed on the main jukebox interface and selection criteria. The terminals 137, 139 may be restricted to only allowing selection of music for play in the zone where each respective terminal is located, or they may allow selection for play in one or more different zones.

Additionally, the graphical interface of the terminals 137, 139 may change in accordance with available selections, themes of the bar, themes of the room in which each terminal is located, or any other suitable criteria.

Figure 7:
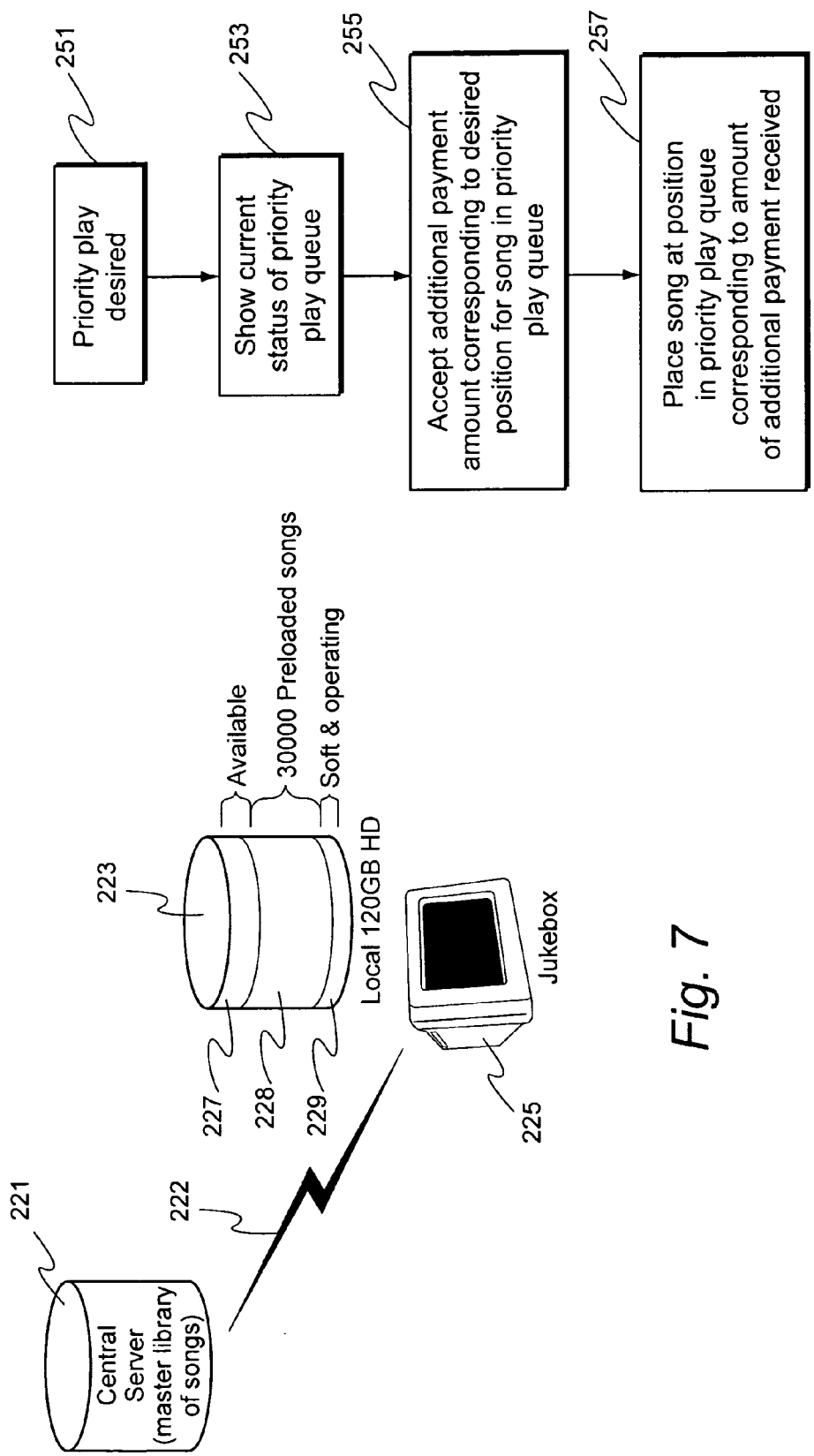
FIG. 7 shows the relationship between a jukebox with expanded media storage and a central server.

FIG. 7 shows the relationship between a jukebox with expanded media storage and a central server. In accordance with an exemplary embodiment, the central server 221 contains a master library of songs, such library comprising all songs that are currently available to be downloaded and all songs currently installed on jukebox hard drives. The central server may communicate 222 with the remote jukebox 225 containing a local hard drive 223. The hard drive 223 on the jukebox may have several sections, including available space for downloads 227, space occupied by preloaded songs 228, and space for software and an operating system 229. Additional suitable sections may be added, including, for example, a section containing different pictures for altering the GUI. The jukebox 225 may communicate with the central server 221 to download songs, upload usage information, update software, and perform any other suitable functions.

Figure 8:
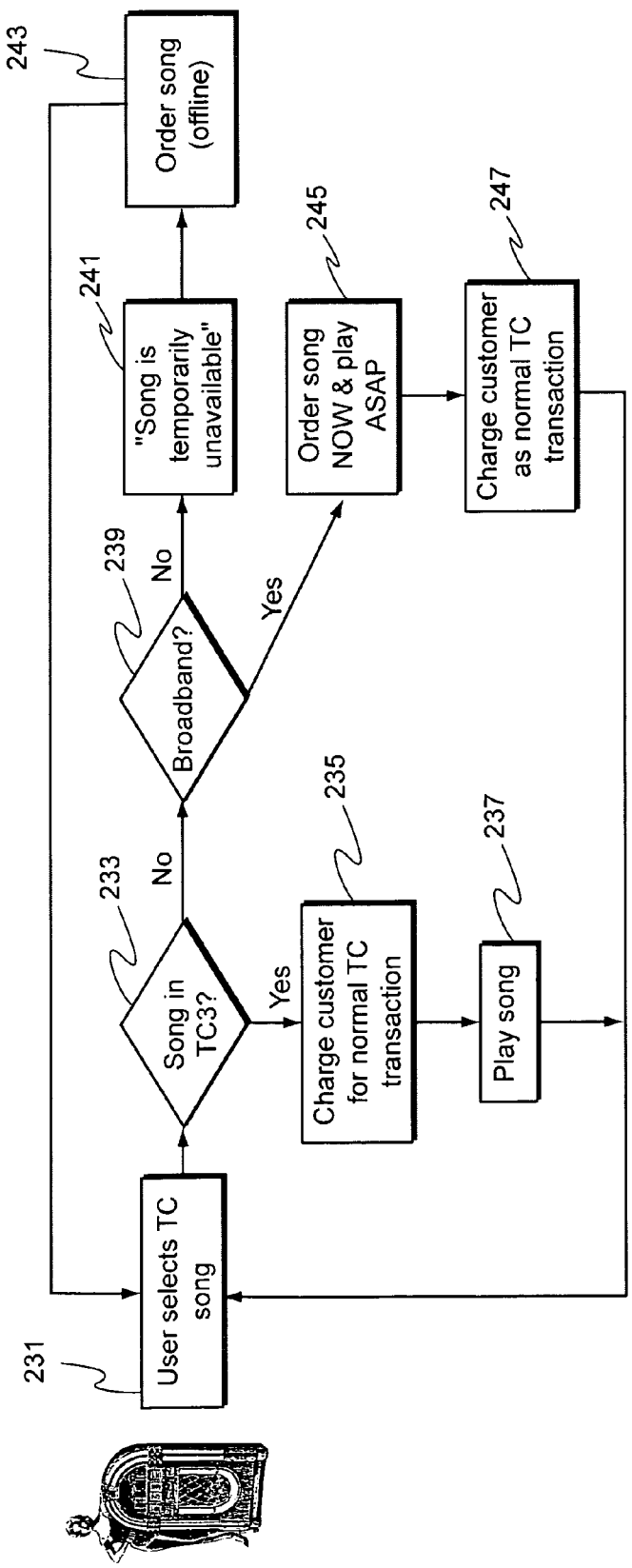
FIG. 8 is a flowchart showing an exemplary process for a song selection process when a song is not in the "standard" available playable song list.

FIG. 8 is a flowchart showing an exemplary process for a song selection process when a song is not in the "standard" available playable song list. In accordance with an exemplary embodiment, the user first selects a song 231. The jukebox checks to see if the song is available on the local hard drive as a "non-standard" selection 233. If the song is available on the local hard drive, the jukebox charges the customer the price set for obtaining and playing a non-standard song 235 and plays the song 237 (or adds it to a playlist, when appropriate).

If the song is not available on the local hard drive, the jukebox checks to see if a high-speed connection to the central server is available 239. If there is no high-speed connection, the jukebox informs the user that the song is temporarily unavailable 241 and orders the song for download 243. The jukebox may or may not charge an additional amount for ordering the song. If, however, there is an available high-speed connection to the central server, the jukebox orders the song immediately and uses the high-speed connection to download the song right away, queuing it up for playing 245. The jukebox then charges the customer the price of a non-standard selection 247. In certain exemplary embodiments, a jukebox may retrieve songs offline, either after a location closes or before it opens. In certain exemplary embodiments, a jukebox may immediately download a song over a dedicated line (e.g., with a dial-up connection). In certain other exemplary embodiments, a song may be downloaded from another jukebox (or other jukeboxes) rather than from a central or limited database to reduce network strain. In certain exemplary embodiments, the jukebox may download songs via a distributed media service in which portions of a given song may be downloaded from a plurality of sources and reassembled for the target jukebox. It will be appreciated that such a peer-to-peer (or jukebox-to-jukebox) or multipeer (several jukeboxes to jukebox) digital downloading network may need to track song licensing information. In certain exemplary embodiments, if a song is not available on a jukebox but other versions or covers are available, the jukebox may recommend to these other songs to the searching user. For example, a user searching for an unavailable Trisha Yearwood version of "How Do I Live" may be recommended available versions by Dolly Parton and/or LeAnn Rimes. Recommendations may be smart enough to ignore similarly named songs that are completely different, such as, for example, the Everly Brothers' "Oh, Pretty Woman" and the Motley Crue's "Pretty Woman."

The factory drive explained above, combined with the morphing capabilities, eliminates the need for the local server explained above, as the factory drive can provide the same services as the local server, without the need for a separate hardware device. In other words, at least some of the factory drive embodiments described herein may enable a jukebox to be shipped with a single mass storage device of any technology (or multiple technologies and/or multiple devices acting as a single mass storage device), while still enabling a basic playable list to be defined, an expanded playable list to be defined, morphing capabilities, local server services to be provided, as well as all other features described herein. The content of the factory drive, as shipped, may be defined using historical, statistical information on customer preferences.

FIG. 9 is a flowchart showing an exemplary process for a priority play queue with prioritization-based-on-bidding capability. According to an exemplary embodiment, the user first indicates that he would like priority play 251. The jukebox then displays the current status of the priority play queue 253. This display may include information such as how many songs are in the queue, what the top bid is, how much has been bid on each song, which songs are "locked in," and any other suitable information about the priority queue. The jukebox then allows the user to select how much additional money the user would like to pay to place his song in a particular spot on the priority list and accepts payment in the selected amount 255. After accepting the payment 255, the jukebox places the song in a position on the priority list corresponding to the additional amount received from the user 257. Alternatively, in another exemplary aspect of the illustrative embodiments, a user can bid on the right to have a song played before other songs previously selected for priority play are played. In an exemplary embodiment, the user is shown the top price paid for a priority play, and can pay more than that price to obtain the highest priority available.

Figure 10:
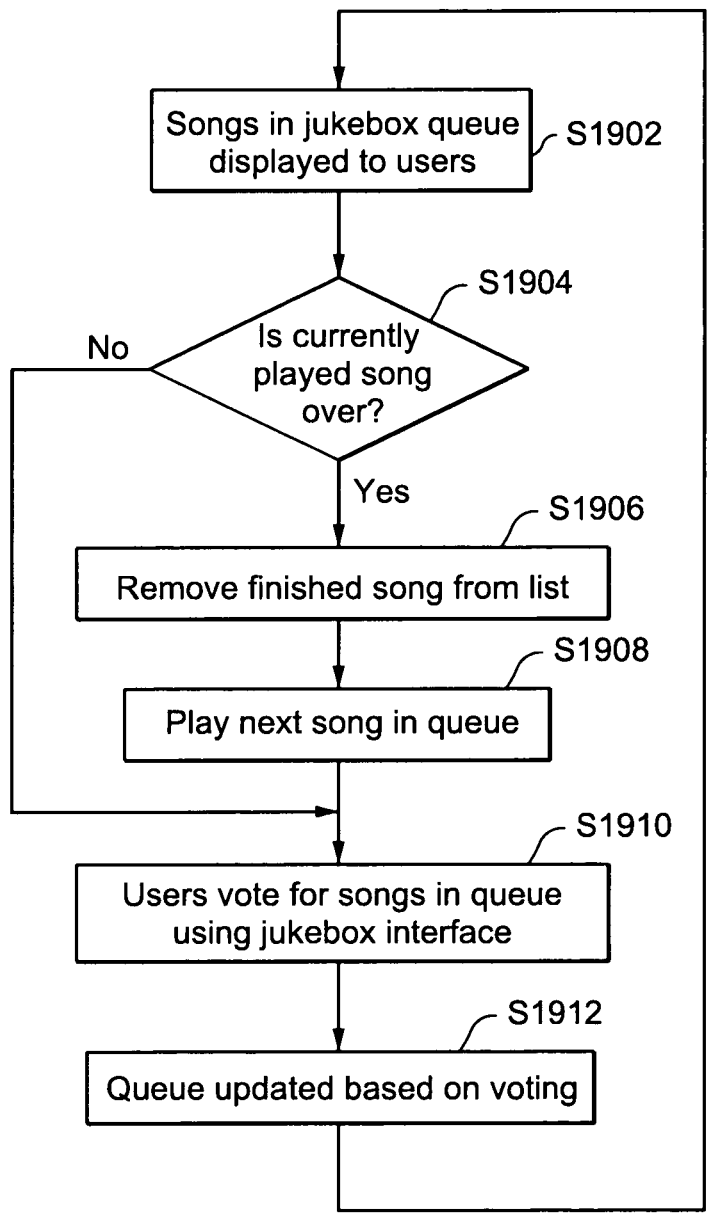
FIG. 10 is a flowchart showing an exemplary implementation of a jukebox voting process.

Similarly, jukebox users may vote for particular instances of media to alter their priority in playlists. In this way, jukebox users can, for example, "battle" for control over the music to be played in a particular zone or particular zones within or among locations. It will be appreciated that this voting/battle mode may be implemented by using, for example, a dynamic queue, a priority queue, multiple queues, etc. It also will be appreciated that a jukebox could be put into a voting mode automatically (e.g., at a particular time of day and/or on a particular day of the week), or it could be triggered manually. FIG. 10 is a flowchart showing an exemplary implementation of a jukebox voting process. Unlike conventional jukebox operations, or even jukebox bidding modes, a list of songs in a jukebox queue is displayed to users in step S1902. This list may be generated automatically, by operators, bar managers, patrons at a bar, etc. The list could be displayed, for example, on a jukebox, or on one or more stand-alone monitors. Additionally, in certain example embodiments, the list could be viewed by a plurality of mobile devices and/or terminals. The information displayed contains at least the artists and names of coming songs, and a number associated with the priority of those songs. The list should be sorted by this number, so that the song with the most "votes" is displayed as the "next" song to be played, followed by the next highest song, etc. Step S1904 determines whether the currently playing song is over. If it is over, step S1906 removes it from the queue, and the next song is played in step S1908. In another embodiment, users could vote to stop/skip the currently playing song (or instance of media) by, for example, exceeding the number of votes the song had before the jukebox started playing.

As users see the coming songs, they will be tempted to push up the songs they like so the songs and/or push down the songs they do not like. In general, the more users who vote, the greater the ambiance of good songs. Thus, after step S1908, or in the case that the song is not over, the jukebox receives users' votes for particular songs in step S1910. Voting can be based on credits (as users buy credits), or tied to a user's account. In certain example embodiments, users must login to place a vote, and in certain example embodiments, users can vote a limited number of times. Users may vote from distinct places within a location. The queue is updated based on this voting in step S1912, and the process returns to step S1902, where the displayed list is refreshed.

In certain example embodiments, the queue may be based on the total number of votes for particular songs. In certain other example embodiments, users may vote for and/or against certain songs and the "net" information may be displayed, indicating the number for and against, or merely the net result. If there are more votes against a song than for, the system can perform one or more of the following functions. For example, the jukebox simply may keep the song in the queue with a negative number of votes. Alternatively, the jukebox may keep the song in the queue with a zero or negative number of votes, but, for example, always wait until the net vote reaches at least 1 before playing the song. Still alternatively, the jukebox may drop any song that reaches zero or a negative number of votes.

Figure 11:
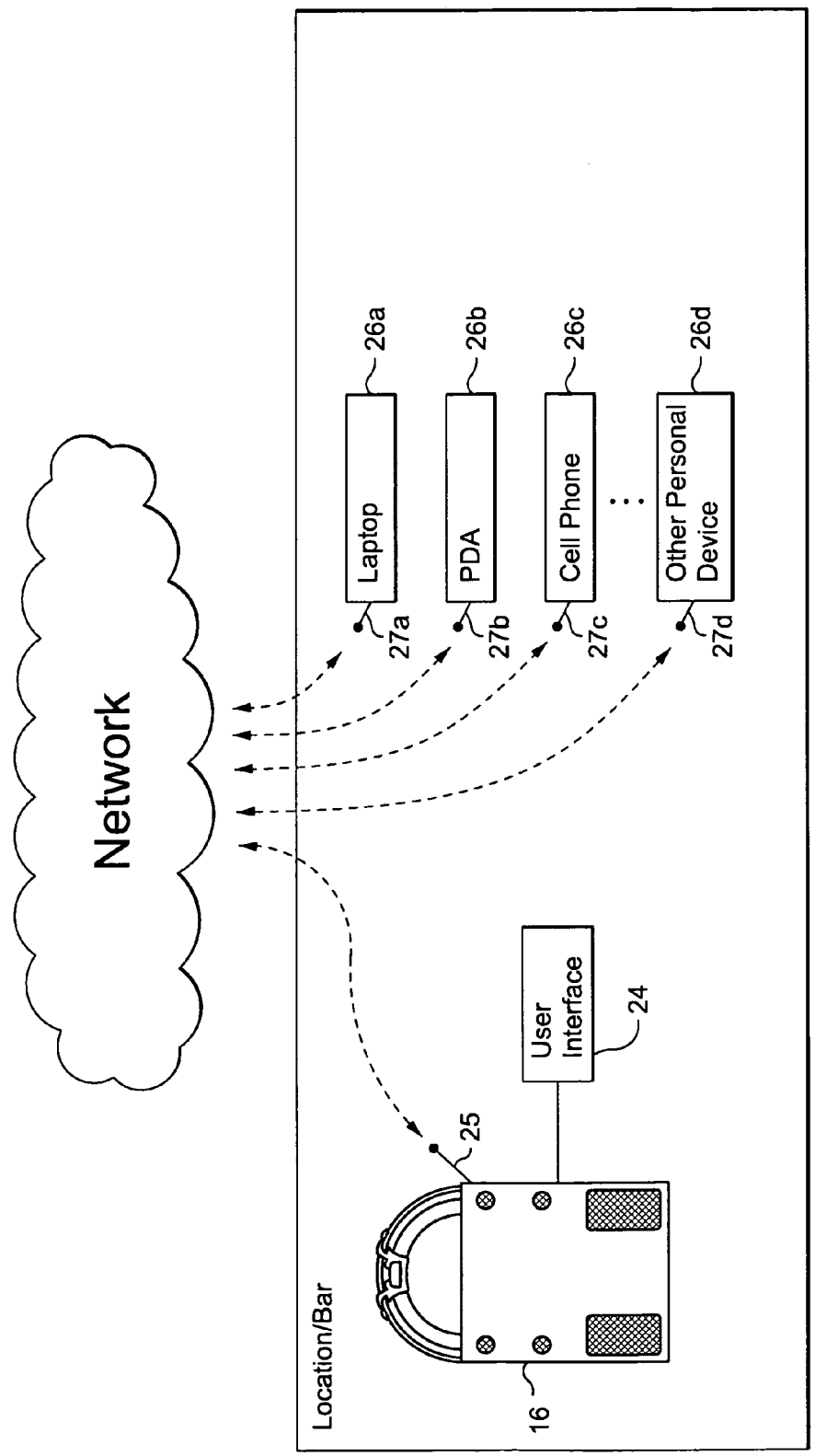
FIG. 11 is a block diagram of an improved downloading digital jukebox system with remote devices accessing a jukebox from within a particular location.

FIG. 11 is a block diagram of an improved downloading digital jukebox system with remote devices accessing a jukebox from within a particular location. A jukebox 16 is located within a particular location, bar, or the like. Users may access jukebox 16 through user interface 24 running thereon. However, users also may access jukebox 16 remotely. Thus, a plurality of mobile devices 26a-26d are shown located in the particular location. Mobile devices 26a-26d are, respectively, a laptop, a PDA, a cell phone, and other personal devices, though it will be appreciated that other properly configured devices may be used. Each mobile device 26a-26d is equipped with a wireless transmitter 27a-27d, respectively. Mobile devices 26a-26d may allow registered users to effectively logon to jukebox devices and access specific content, such as, for example, customized playlists, personalized screens, messages from other recognized users, etc. A change made by one of the mobile devices 26a-26d (e.g. to user settings, playlist setup, etc.) will be reflected by all of the mobile devices 26a-26d. For example, if a user creates a new playlist, edits an existing playlist, changes a password, etc. on a jukebox via user interface 24, user interfaces 24a-24f will reflect that change.

Mobile devices 26a-26d may communicate through an external network to communicate with jukebox 16 having communicator 25. It will be appreciated that mobile devices 26a-26d may communicate over a LAN, wireless Internet, Bluetooth, or any other suitable communications network.

A central database of recognized user information may be maintained and accessible by each of the jukebox devices 16, 16a-f and remote devices 26a-d. However, in some exemplary embodiments, local databases of recognized user information may be maintained on devices. The devices may communicate with each other through a communications network, such as, for example, the Internet. However, it will be appreciated that other communications methods are possible, such as, for example, through wired communications over a LAN, wireless communications, etc.

FIGS. 12-16 provide additional, non-limiting exemplary configurations that remotely access jukeboxes. It will be appreciated that other variations on and combinations of these exemplary configurations are possible and contemplated herein.

Figure 12:
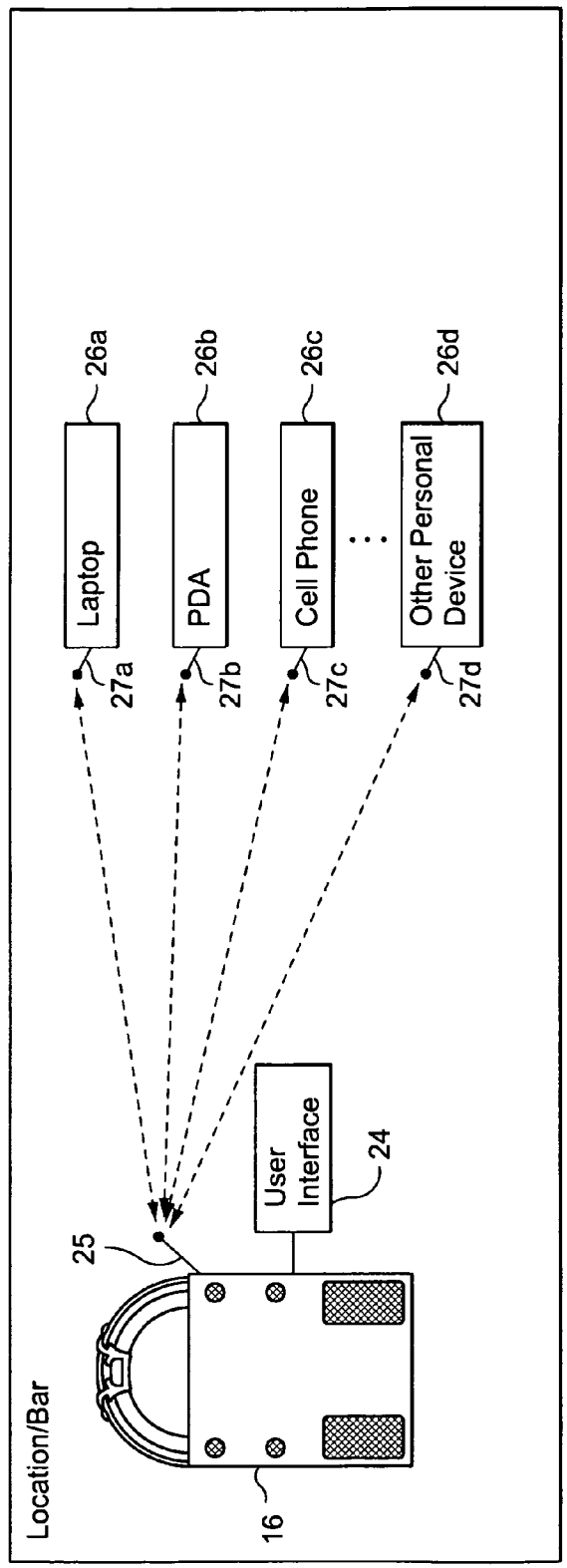
FIG. 12 is a block diagram of an improved downloading digital jukebox system with remote devices accessing a jukebox from within a particular location.

FIG. 12 is a block diagram of an improved downloading digital jukebox system with remote devices accessing a jukebox from within a particular location. In this exemplary embodiment, jukebox 16 and the plurality of remote devices are located within a particular location. Jukebox 16 includes a user interface 24 that allows jukebox users to, for example, make selections, create profiles, edit playlists, etc. Jukebox 16 also includes a wireless communications device 25. Remote devices 26a-26b communicate with jukebox 16 through their respective wireless communication devices 27a-c. In this example embodiment, remote devices 27a-c are, respectively, a laptop, a PDA, and a cell phone. It will be appreciated that other remote devices may communicate with jukebox 16. It also will be appreciated that remote devices according to this system may operably communicate with jukebox 16 from outside the particular location, with the range being determined by the hardware on jukebox 16 and remote devices 27a-c and the protocols over which they communicate. Thus, for example, wireless communications over 802.11g connections may allow for users to access jukebox 16 from within a location, tables setup outside the location, and other areas immediately surrounding the area.

Remote devices 26a-c allow users to login to jukebox 16 remotely, without having to access jukebox 16 and user interface 24 directly. Thus, a user can, for example, play songs, edit playlists, and perform other jukebox-related activities without using user interface 24 directly. It will be appreciated that remote devices 27a-c may have their own user interfaces, which may be the same as or different from user interface 24. User profile information may be stored locally on jukebox 16, on a remote server (not pictured), or on a remote device 27. A change made by a remote device (e.g., to user profile information, playlist contents, purchased media, etc.) would be mirrored on jukebox 16, any other associated remote devices, and/or on other jukeboxes, etc.

Figure 13:
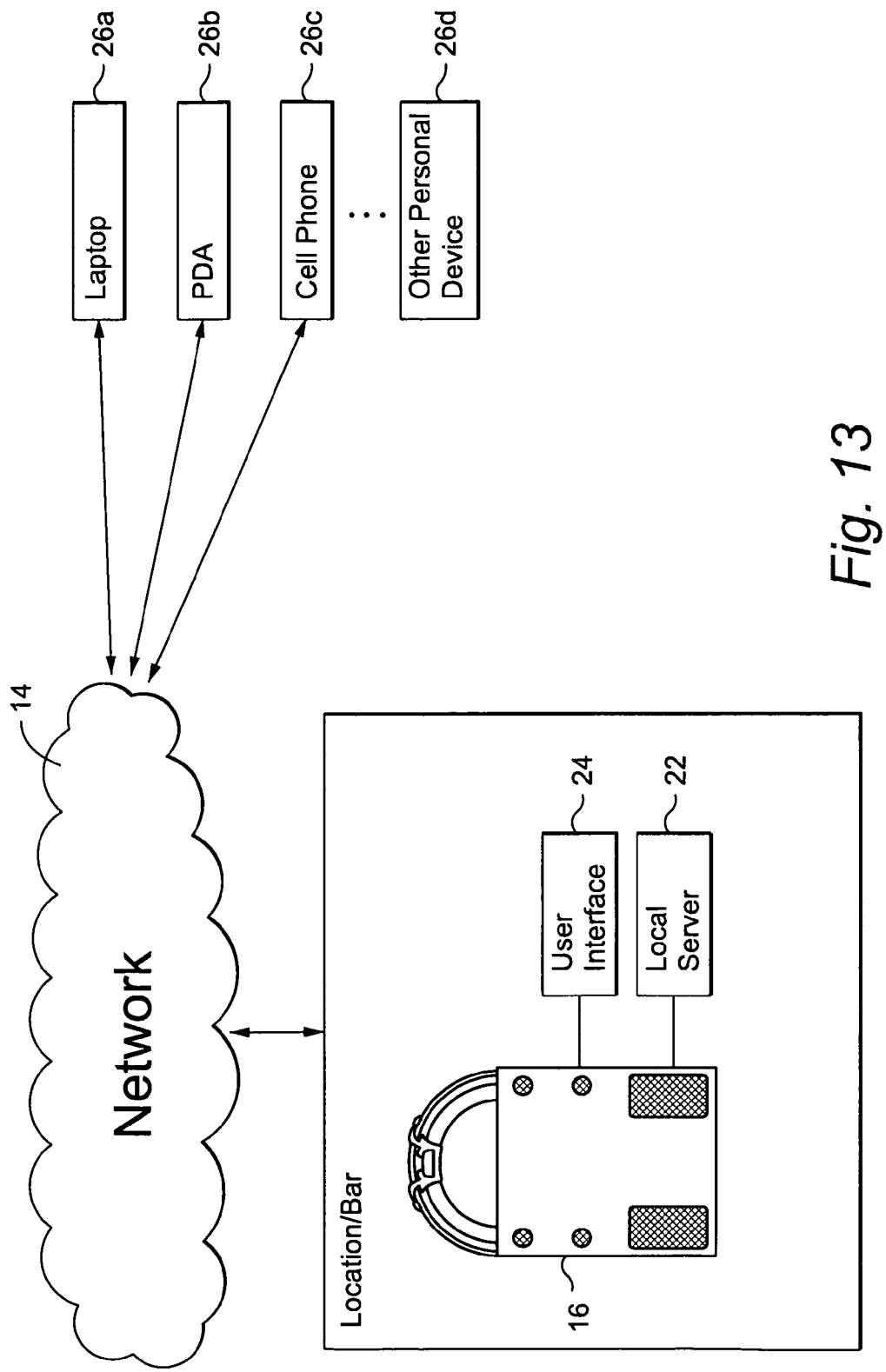
FIG. 13 is a block diagram of an improved downloading digital jukebox system with remote devices outside of a particular location accessing the digital jukebox system.

FIG. 13 is a block diagram of an improved downloading digital jukebox system with remote devices outside of a particular location accessing the digital jukebox system. In this exemplary embodiment, jukebox 16 with local server 22 and user interface 24 is connected to a network 14. Unlike remote devices 26a-26c which connect directly with jukebox 16 in FIG. 12, these remote devices 26a-26c also are connected to network 14. Thus, users may login to jukebox 16 over a potentially broad area. For example, remote devices 26a-26c may connect with jukebox 16 over LAN, WAN, Internet connection, or the like. User profile information may be stored on local server 22. Again, a change made by a remote device (e.g., to user profile information, playlist contents, purchased media, etc.) would be mirrored on jukebox 16, any other associated remote devices, and/or on other jukeboxes, etc.

Figure 14:
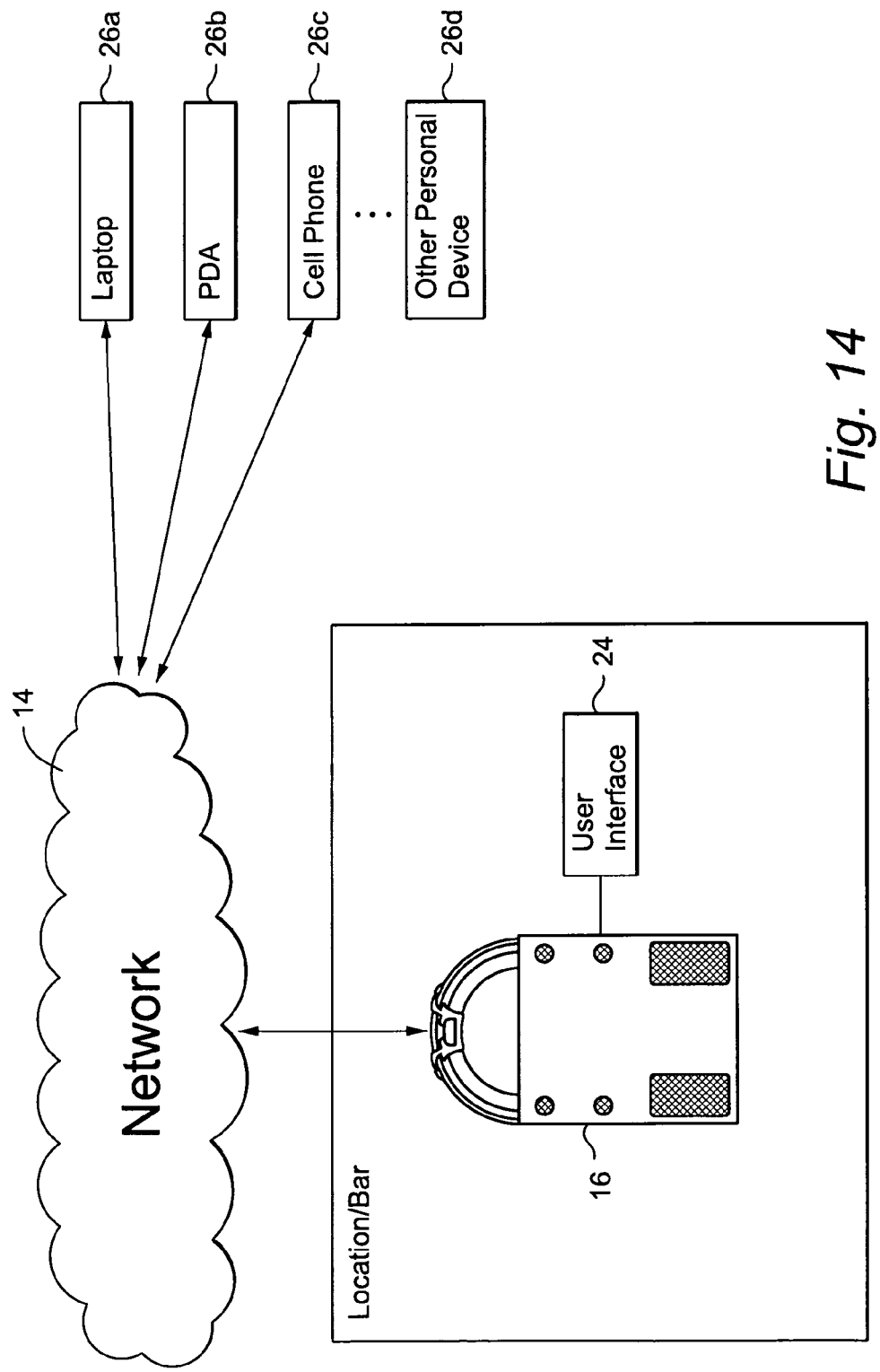
FIG. 14 is another block diagram of an improved downloading digital jukebox system with remote devices outside of a particular location accessing the digital jukebox system.

FIG. 14 is another block diagram of an improved downloading digital jukebox system with remote devices outside of a particular location accessing the digital jukebox system. FIG. 14 is like FIG. 13, in that a plurality of remote devices 26a-26c are connected to jukebox 16 over network 14. However, FIG. 14 includes a database 29 connected to network. 14. Database 29 may store, for example, user profile information, users' playlist definitions, etc. This configuration may be advantageous in some exemplary implementations because a plurality of jukeboxes connected to network 14 may all access the central database 29 without contacting individual jukeboxes or individual remote devices, which may not always be available.

Figure 15:
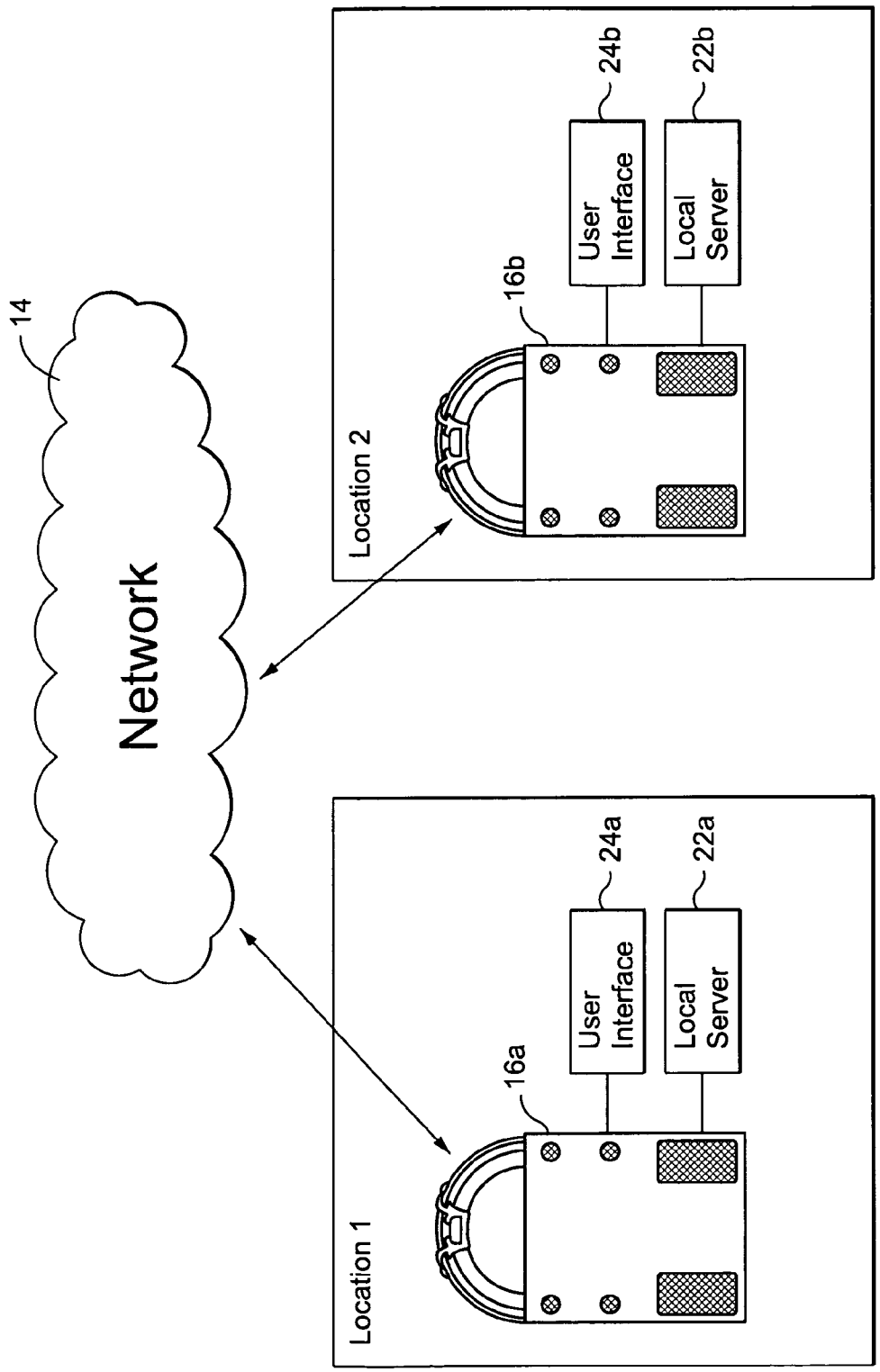
FIG. 15 is a block diagram of an improved downloading digital jukebox system with another downloading digital jukebox system outside of a particular location accessing the first digital jukebox system.

FIG. 15 is a block diagram of an improved downloading digital jukebox system with another downloading digital jukebox system outside of a particular location accessing the first digital jukebox system. In this exemplary embodiment, a jukebox 16a with a local server 22a and a user interface 24a are located within a first location, and a jukebox 16b with a local server 22b and a user interface 24b are located within a second location. It will be appreciated that the locations may be different rooms within a single bar, two separate establishments, etc. Both jukebox 16a and jukebox 16b are connected via network 14. User profile information may be stored at one or both of local server 22a and 22b. In some exemplary embodiments, if user profile information is stored on only one local server, a user logging-in to one jukebox would be able to access information stored on the other local server. In other exemplary embodiments, if user profile information is stored on both local servers, any changes made on one jukebox would be mirrored on the other. In still other exemplary embodiments, user profile information may be retrieved from a first jukebox and stored to a second jukebox only when a user accessed the second jukebox. These configuration are advantageous because they do not distribute user information to areas where users do not access their information. For example, a user who travels from Washington to Los Angeles on business would be able to access that user's particular information created in Washington by logging-in to a jukebox in Los Angeles; however, because that hypothetical user has not logged-in to a jukebox in Montreal, jukeboxes there would not necessarily have the user's information stored locally.

Figure 16:
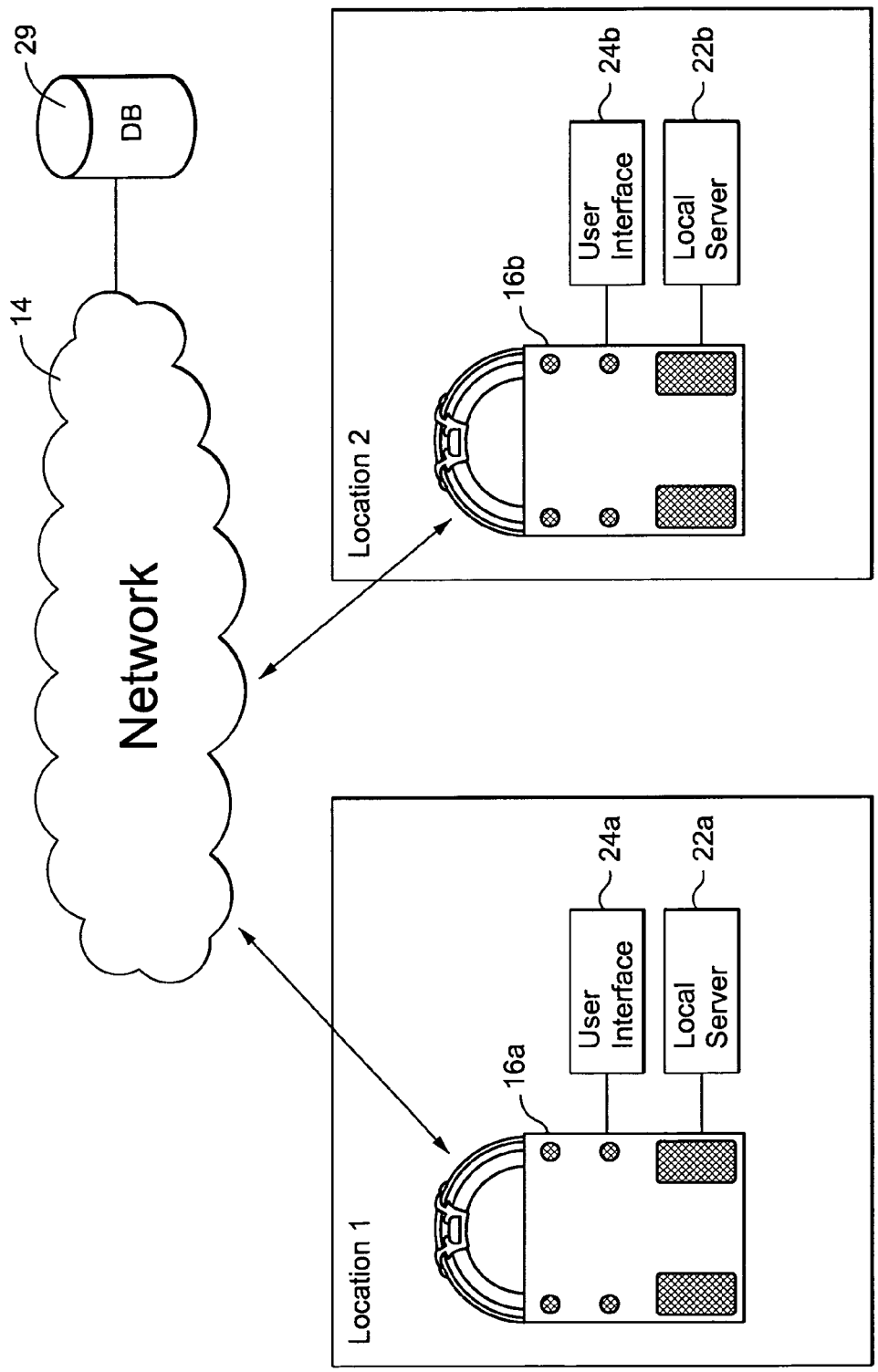
FIG. 16 is another block diagram of an improved downloading digital jukebox system with another downloading digital jukebox system outside of a particular location accessing the first digital jukebox system.

FIG. 16 is another block diagram of an improved downloading digital jukebox system with another downloading digital jukebox system outside of a particular location accessing the first digital jukebox system. FIG. 16 is like FIG. 15, in that a jukebox 16a is connected to a jukebox 16b over network 14. However, FIG. 16 includes a database 29 connected to network 14. Database 29 may store, for example, user profile information, users' playlist definitions, etc. This configuration may be advantageous in some exemplary implementations because a plurality of jukeboxes connected to network 14 may all access the central database 29 without contacting individual jukeboxes or individual remote devices, which may not always be available. It will be appreciated that a plurality of jukeboxes may be attached through network 14.

Given these and other sets of features, certain exemplary embodiments provide systems and/or methods for enhancing yet further the interactivity of jukebox-related experiences. In general, many installation venues are suitable for additional video monitors that can provide video streams including entertainment, information, advertising, and the like to local patrons. This video content may complement and further enhance the interactive experience that the jukebox currently provides, while enabling patrons not directly in front of the jukebox to participate in the interactive process. Accordingly, video hardware, software, and/or service offerings may be provided to create new revenue opportunities as well as a compelling entertainment experience for patrons. Indeed, with more than 24,000 suitably enabled jukeboxes currently deployed, each being equipped with Internet connectivity, operators and national account customers and advertising partners may be able to provide additional value to venues through the innovative use of managed video content.

To accomplish this and/or other goals, video related services may be provided via a video server. The video server may be built directly into a jukebox, or it may be external to the jukebox. That is, the video server may be located within a housing of the jukebox or may be located external to the housing of the jukebox. For example, it may be in the form of a small programmable card insertable into one or more displays. The video server may effectively off-load video playback from the jukebox. This frees the jukebox to provide its core features (e.g., responding to user requests, etc.) without having to spend significant processing power providing for other video services. For example, the video server may help to reduce the strain placed on a storage location storing instances of media, a processor responsible for handling user requests via a graphical user interface (GUI), and/or other components associated with typical jukebox functionality. The video server thus may be able to receive, decode, distribute, etc. video streams to one or more displays on and/or remote to the jukebox (e.g., television monitors, user-operated portable devices such as PDAs, cell phones, laptops, game devices, etc.). The video server may receive and/or display content from the jukebox, from its own internal storage, from a remote source (e.g., from a user device, via the distribution network, etc.), or the like. This may be done in response to a signal from the jukebox (e.g., a processor of the jukebox). Thus, the video server solution may be conceived of as a field upgradeable option that continues to respect the temperature and power requirement envelopes currently supported by existing jukebox models.

The video server may drive multiple displays and/or sets of displays. Displays may be mounted in groups, with each display in a display group being a different member of the set. Thus, for example, when the video server provides for two sets of displays, displays may be mounted in pairs, with different first and second displays provided to the mounted pair. The video server may manage the content programming the groups or portions of the groups automatically, dependently or independently of one another. The same or different video content may be directed to individual displays in a group of displays. Additionally, portions of video content may be displayed across displays in a group of displays.

A scheduling module may be provided to one or both of the jukebox and video server. The scheduling module may cooperate with the jukebox and the video server to provide synchronized and/or non-synchronized content. For example, it may be advantageous to provide video content that is not synchronized to the music to avoid preparing derivative works in violation of copyright law and/or pertinent licensing agreements, whereas it may be advantageous to provide synchronized content to provide audio and/or video introductions to registered users' playlists (e.g., via their avatars). Of course, it will be appreciated that there are other times, events, and circumstances in which it may be advantageous and disadvantageous to provide synchronized content. To this end, the scheduling module, jukebox, and/or video server may be programmed by the proprietor, operator, central authority, licensing outfit, etc. to provide synchronized/non-synchronized content as appropriate. As such, the video server may have its own periodicity for displaying content. However, the jukebox and the video server may be free to create their own schedules alone or in cooperation. It also will be appreciated that a delay timer may be used to account for delays and/or latencies between the jukebox, video server, and/or display(s). For example, video may be requested or played slightly in advance or behind where it normally would be played so as to account for delays and/or latencies.

Figure 17:
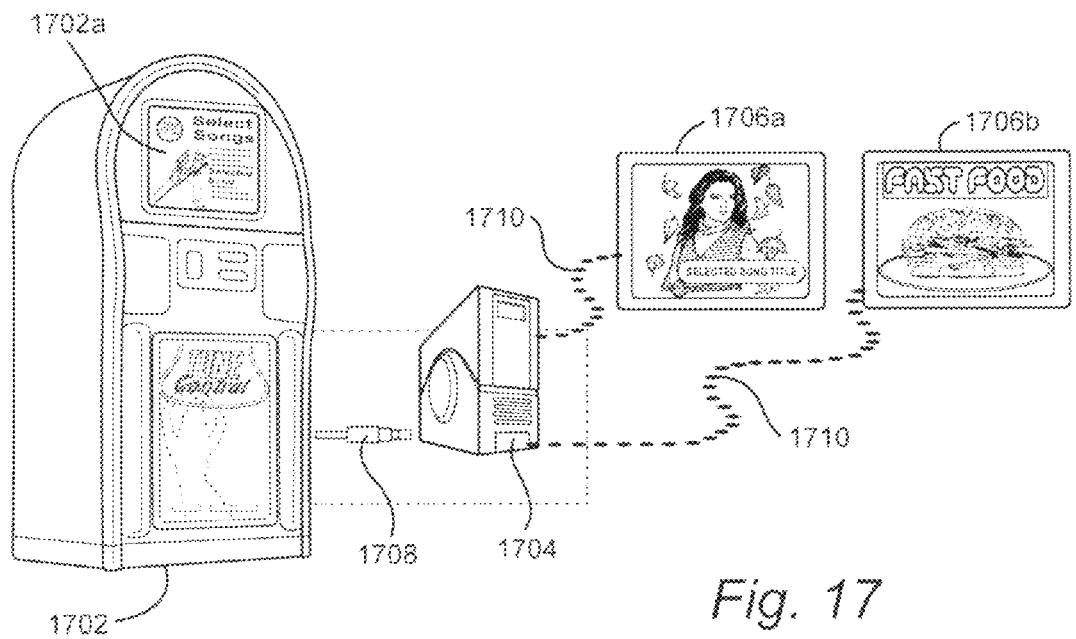
FIG. 17 is an illustrative view of a jukebox device having an associated video server external to the jukebox in accordance with an exemplary embodiment.

FIG. 17 is an illustrative view of a jukebox device having an associated video server external to the jukebox in accordance with an exemplary embodiment. In FIG. 17, a jukebox 1702 having a display 1702a located thereon is shown. The jukebox 1702 may have a video server 1704 associated therewith. The video server 1704 may drive two displays 1706a, 1706b. A first connection 1708 (e.g., an Ethernet connection) may connect to may connect the jukebox 1702 to the video server 1704, and one or more second connections 1710 may connect the video server and the displays 1706a, 1706b. It will be appreciated that, as noted above, the video server may driver an arbitrary number of displays of sets of displays. As shown in FIG. 17, the jukebox display 1702a is displaying a song selection screen, the first remote display 1706a is displaying a music video corresponding to the currently playing song, and the second remote display 1706b is displaying an advertisement.

The jukebox and/or video server may be configured to provide audiovisual data to the screens in many ways. For example, audio/video may be displayed on all displays. Alternatively, audio/video may be displayed on at least some displays or on at least some groups of displays, with those displays optionally being specified by an authorized user (e.g., operator, manager, etc.). The jukebox display (e.g., the "now playing" screen, selection screens, etc.) may be mirrored on remote displays. Videos may be displayed, as may banner advertisements. Scrolling tickers also may be displayed, e.g., on the bottom or top of one or more screens. Such audiovisual content may be superimposed on displays, game devices, terminals, etc. Prerecorded audiovisual messages also may be displayed, e.g., in the form of slideshows, videos, etc. Various visualizations (e.g., audio visualizations based on, for example, Fourier transforms, also may be displayed). Other features, such as, for example, playing, loading, deleting, and streaming content may be made available by the jukebox and/or video server (e.g., the jukebox may provide an interface to the video server, etc.) for authorized users to manage media content. Also, as alluded to above, the content may be provided to some or all displays, and/or to some or all groups of displays.

The video services may have one or more of several illustrative characteristics. For example, one feature of overhead video content may include segment programming that tends to be more engaging than digital signage. Such segment programming may integrate into the entertainment experience that is being built around the jukebox zone. To accomplish this, segments may be sequenced in a manner that frequently engages the viewer to review, respond, and recall elements of the material presented. Such sequencing features may be thought of as a potentially interactive playlist for the video server. The playlist may be stored on the jukebox, the video server, or a central location accessible by a plurality of jukeboxes and/or video servers. For example, input may be taken from devices other than and/or in addition to the jukebox such as, for example, PDAs, laptops, game systems, cell phones, and the like in response to the video content displayed by the video server. In this way, the video server may promote more interactive uses of jukebox-related features. Of course, it will be appreciated that the video server's output displays may be touch screens configured to accept the input directly.

To support this capability, the already existing media scheduling engine presently used to drive the attract mode of the jukebox may be improved, or a separate media scheduling engine may be provided. The media scheduling engine may be capable of sequencing video segments to one or more display groups (e.g., in a planned and/or automatic fashion). The services may be scalable so that customers may allocate a portion of their existing disk storage to video so as to enable the implementation of such services without the need for additional moving parts. Conversely, it may be possible to add disk capacity for video content to a separate unit.

Various video content tools may be provided to the jukebox and/or the video server. For example, the distribution network may have the ability to remotely administer jukeboxes individually and/or in groups. Jukeboxes may have their content modified based on, for example, schedules and/or characteristics of the jukebox population in question. The video service may allow new content types to be distributed via the network based on schedules, which may be developed in collaboration with the jukebox manager, operator, etc. Accordingly, based at least in part on the content, the jukebox provider, the operator, and/or the national account customer optionally may have the ability to manage content segments and influence the schedule and transition behavior when these sequences are presented.

In particular, a broadband link may be provided via the audiovisual distribution network described with reference to FIGS. 1 and 2. Such tools and features may be accessible via a web-based portal. Thus, the ability to control video signage segments and/or overlays without corrupting the user experience may prove to be very valuable to venue operators, operators, and corporate advertisers. In addition, venue operators, operators, and corporate advertisers may have the ability through such tools to create "skins" to further customize the experience, distribute custom media content (e.g., to be associated with registered users, custom advertisements, etc.), games, artwork (e.g., to be associated with custom albums, registered users, etc.) advertisements, etc.

Because the installed jukebox base may represent a significant investment for customers and many future customers may not wish to invest in full video capability for all locations, the video service capability may be packaged as an addition to an existing jukebox. Of course, it will be appreciated that some configurations including existing gaming systems such as JVL or Merit may require additional hardware to support all video features.

As noted above, the video server may be physically located within the jukebox enclosure. When storage is shared between the jukebox and the video server, the video server may be scalable so that customers may allocate a portion of their existing disk storage to video and implement a video server unit with no moving parts. Conversely, it may be possible to add disk capacity for video content to the video server unit itself. Furthermore, to facilitate connections, a junction panel or junction box may be provided. Such a junction box may provide a conveniently mounted cable attachment point for display groups. Video repeater equipment may be include and/or incorporated from third-party vendors to allow customers to install multiple sets of displays.

Figure 18:
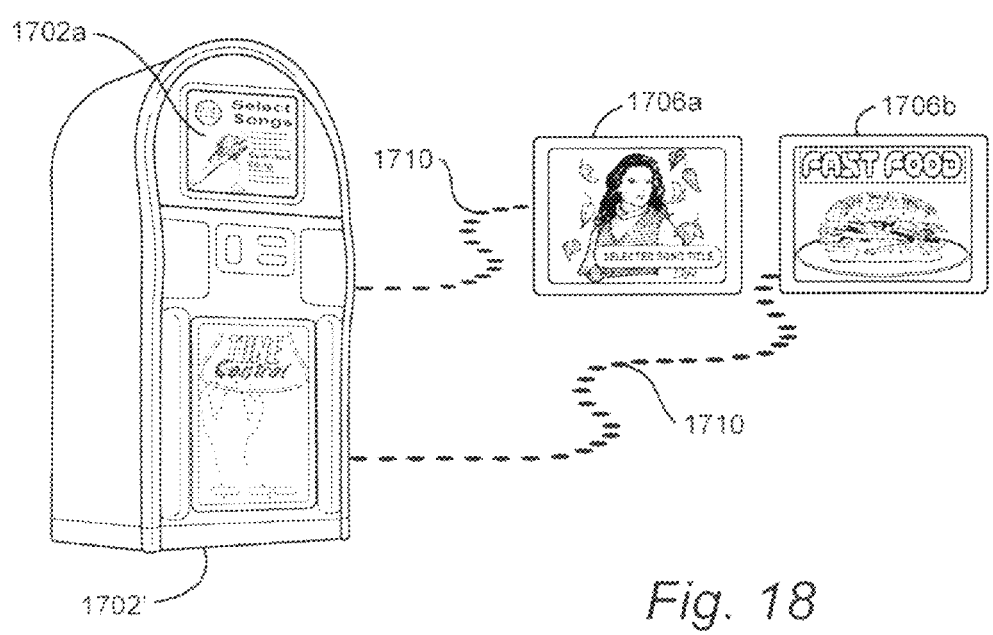
FIG. 18 is an illustrative view of a jukebox device having an associated video server internal to the jukebox in accordance with an exemplary embodiment.

FIG. 18 is an illustrative view of a jukebox device having an associated-video server internal to the jukebox in accordance with an exemplary embodiment. In FIG. 18, the video server 1704 is built into the housing of the jukebox 1702'. Thus, the second connections 1710 extend from the jukebox 1702' housing (e.g., from a junction panel formed on the backside thereof) to the first and second remote displays 1706a, 1706b. As above, the jukebox display 1702a is displaying a song selection screen, the first remote display 1706a is displaying a music video corresponding to the currently playing song, and the second remote display 1706b is displaying an advertisement.

The video services may contribute to and/or provide social networking-related features. Such community and social networking features may increase yet further the customizable, interactive feel of the venue. For example, as described above, devices such as, for example, mobile phones, smart phones, PDAs, portable gaming consoles, laptops, and the like may be integrated into the jukebox zone to provide the opportunity to transform the jukebox into an interactive entertainment server. The displays may display social networking related content (e.g., custom messages, avatars, welcome screens, etc.).

The ability to share the interaction with these devices with other venue patrons may also involve features for displaying exchanges between users and/or their devices throughout the venue. For example, text, audio, and/or video messages may be displayed throughout the venue. Certain exemplary embodiments address this need and provide a platform on which to build new patrons, based on, for example, vendor experiences.

Figure 19:
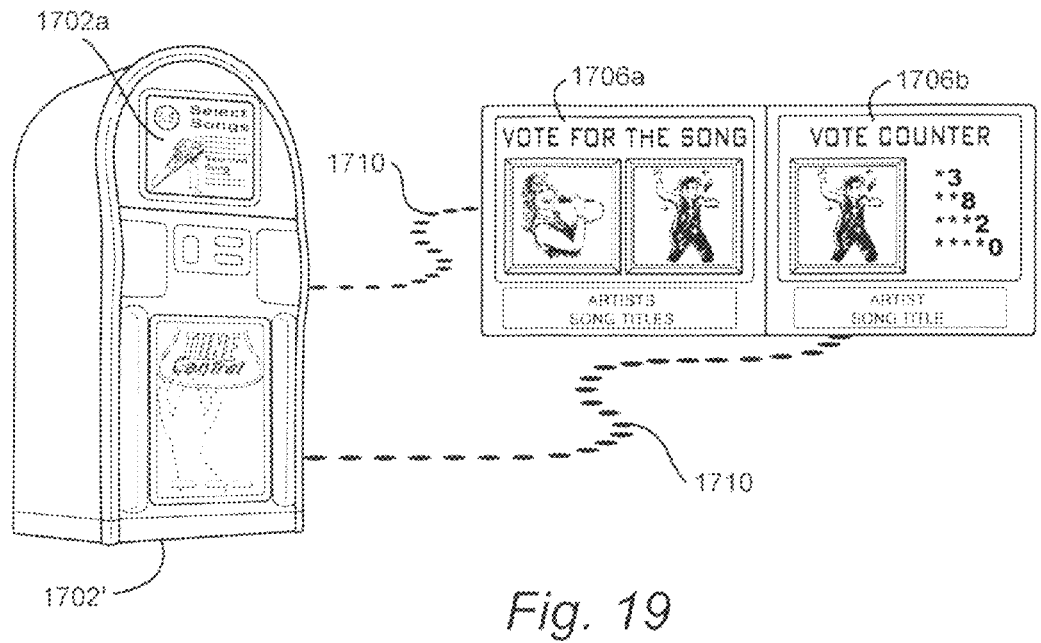
FIG. 19 is an illustrative view of a jukebox device having an associated video server with the video server helping to provide for live content features in accordance with an exemplary embodiment; and, FIG. 20 is an illustrative view of a jukebox device having an associated video server with the video server helping to provide for customized, spreadable advertisements in accordance with an exemplary embodiment.

For example, FIG. 19 is an illustrative view of a jukebox device having an associated video server with the video server helping to provide for live content features in accordance with an exemplary embodiment. In FIG. 19, a voting system similar to that described above is shown. In particular, the first remote screen 1706a shows a song for which users may vote. Users are asked to rank the song between one and four stars. The votes are tallied by the jukebox 1702' and/or the video server 1704, and the results are displayed on the second remote display 1706b. The second remote display 1706b may be updated by the jukebox 1702' and/or the video server 1704 as more and more votes are received. Of course, other possibilities for games, interactive features, etc. are possible.

Because existing networks supports live, on-demand material, customers may further exploit this feature to create multi-venue experiences.

Concurrent programming is another feature of the video server and/or jukebox that may relate to advertising. As noted above, the music experience and contextual information currently present during music performances may or may not be replaced by video content such as, for example, advertising, music videos, games, etc. This desired flexibility has driven the feature for video servers to provide, when appropriate, simultaneous, asynchronous presentations of video streams on identified video screens, while the music and/or music video performance takes place. When no music performance is active and/or at times when it is appropriate, video presentation groups can be spread out among multiple displays. This may allow for a widescreen and/or scrolling capability for additional visual impact. Accordingly, content may span one or more screens, with one or more video servers potentially powering one or more displays. For example, each separate display may function as its own server or as a server for a group of displays. These scenarios reflect the off-loading of video processing from the main jukebox, as the video server may be located in the jukebox housing as a separate component, provided to one or more displays, etc. Thus, the displays within a location and/or among locations may display video content at substantially the same time.

Figure 20:
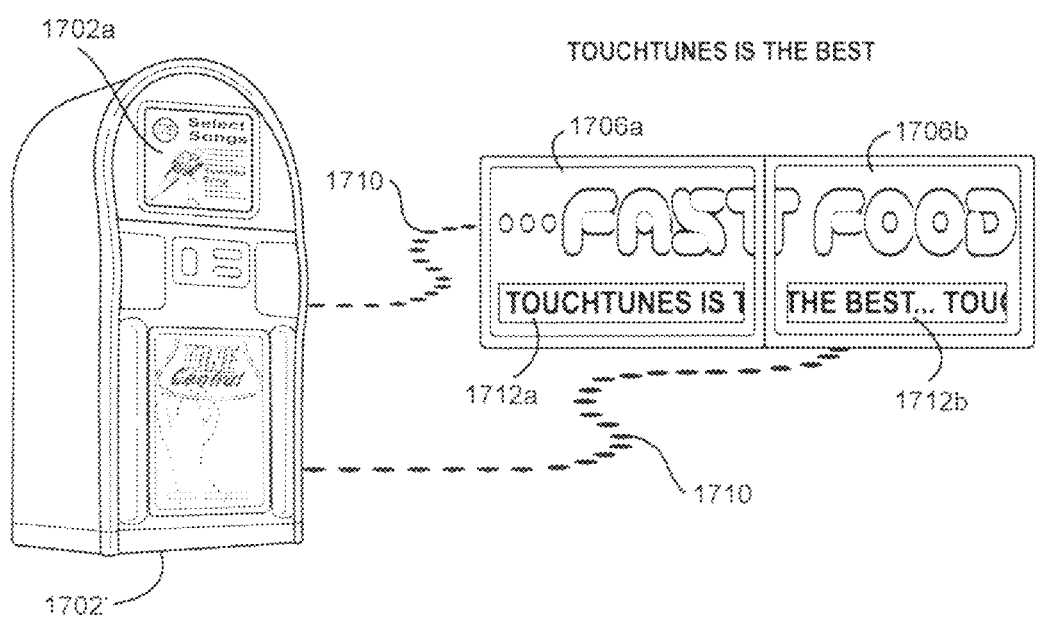

FIG. 20 is an illustrative view of a jukebox device having an associated video server with the video server helping to provide for customized, spreadable advertisements in accordance with an exemplary embodiment. In FIG. 20, the first and second remote screens 1706a, 1706b are grouped closely together. Thus, one large advertisement is made visible as spread across both screens. Moreover, a scrolling ticker or advertisement scrolls across both screens in areas 1712a and 1712b. Of course, other widescreen displays may be made visible (e.g., widescreen music videos, movies, or other video content), and the scrolling text also need not necessarily be advertising information.

The video services may deliver a seamless content workflow that allows for a continuous distribution of segments to the jukebox network. In addition, stakeholders (e.g., proprietors, users, operators, advertisers, etc.) may have the ability to submit content for presentation. Although the creation of video content (e.g., live action, animated two-dimensional objects, signage, or the like) requires both technical and creative skills, tools may be provided to make at least the sharing and/or the creation of such media easier. As such, much of the value of marketing and advertising through venues may relate to the ability to deliver fresh content. Accordingly, the workflow for creating, uploading, updating, managing, etc. content must be highly automated and extremely stable. New content segments, segment schedules, etc. must be deployable with a reduced chance of disrupting the existing segment sequences. To facilitate such processes, relevant stakeholders may be provided with and/or acquire equipment capable of transmitting and receiving broadcast media.

Such video services represent a step towards creating an improved interactive jukebox space. This is particularly true given the determination that customers tend to need more than just music videos playing along with the audio to create a truly dynamic, interactive environment. Accordingly, certain exemplary embodiments described herein may provide systems and/or methods that leverage powerful existing digital audiovisual distribution networks already in place, the tremendous content management architecture used to manage over a billion plays thus far, and reliable scalable equipment.

While the preferred aspects of the invention have been illustrated and described herein, it will be apparent to one of ordinary skill in the art that various changes and/or modifications can be made. Thus, the specific description herein is meant to be exemplary only and is not intended to limit the invention beyond the terms of appended claims.

What is claimed is:

1. A digital jukebox device, comprising:
   a display configured to display jukebox-related video content;
   a first storage location storing a plurality of instances of audio content for playback by the jukebox device;
   a payment accepter for accepting payment to enable playback of the instances of audio content by the jukebox device; and
   a processor configured to (1) playback, without involving a video server and via speakers of the jukebox device, an instance of audio content stored on the first storage, (2) display, without involving the video server and on the display of the jukebox device, a first video content including a song selection screen while the instance of audio content is currently being played back, (3) instruct the video server in communication with the jukebox device to reproduce, in synchronization with the jukebox device, on one or more displays or groups of displays remote from the jukebox device that are each connected to the video server, one or more second video content stored on a second storage location accessible by the video server, wherein at least one of the second video content, which is different from the first video content, is associated with the instance of audio content currently being played back, and (4) receive updated audio content from, and provide royalty accounting information to, a remotely located central server;
   a communication circuit through which the jukebox device is configured to receive updated audio content from, and provide royalty accounting information to, a remotely located central server; and
   a jukebox housing incorporating the display and the payment acceptor and the speakers, wherein the first storage location, the processor the communication circuit and the video server are located within said jukebox housing,
   wherein the video server is configured to coordinate playback of at least one of the second video content, receivable from a remote network location, on the one or more displays or groups of displays, and is further configured to access at least one of the second the video content stored on the second storage location independent of the first storage location of the jukebox device, the coordinated playback being substantially offloaded from the processor of the jukebox device and the first storage location to the video server.

2. The digital jukebox device of claim 1, wherein the displays remote from the jukebox are grouped so as to display the same video content on each said display in the group.

3. The digital jukebox device of claim 1, wherein the displays remote from the jukebox are grouped so as to display portions of video content on each said display in the group in synchrony.

4. The digital jukebox device of claim 1, wherein the video server is configured to further coordinate the video content displayed by the one or more displays or groups of displays with the display of the jukebox device in dependence on a function being accessed by a user of the jukebox device.

5. The digital jukebox device of claim 1, wherein the video server is configured to further coordinate the video content displayed by the one or more displays or groups of displays in dependence on a predefined video playlist.

6. The digital jukebox device of claim 5, wherein the video playlist includes instructions for displaying video content in a predetermined order, and at a predetermined time or event.

7. The digital jukebox device of claim 5, wherein the video playlist includes instructions for displaying video content corresponding to segment programming.

8. The digital jukebox device of claim 1, wherein the video content displayed by the one or more displays or groups of displays corresponds to video content that prompts one or more viewers of said video content to interact, directly or indirectly, with the jukebox device.

9. The digital jukebox device of claim 8, wherein the video content displayed by the one or more displays or groups of displays corresponds to video content that prompts one or more viewers of said video content to vote to determine an instance of audio content to be played by the digital jukebox device.

10. The digital jukebox device of claim 1, wherein the video content displayed by the one or more displays or groups of displays corresponds to video content pertaining to a social network accessible via the jukebox device.

11. The digital jukebox device of claim 1, wherein the video server further comprises a delay time configured to account for delays and/or latencies between the jukebox device and the video server.

12. The digital jukebox device of claim 1, further comprising displaying, by the video server, video content on the one or more displays or groups of displays that corresponds to video content that prompts one or more viewers of said video content to interact, directly or indirectly, with the jukebox device.

13. A digital audiovisual distribution network, comprising:
   a central server including a central store of instances of audio content; and
   a plurality of digital jukebox devices respectively located at a plurality of locations, each being remote from the central server and the central store, each said digital jukebox device comprising:
      a display configured to display jukebox-related video content;
      a first storage location storing a plurality of instances of audio content for playback by the jukebox device;
      a payment accepter for accepting payment to enable playback of the instances of audio content by the jukebox device; and
      a processor configured to (1) playback, without involving a video server and via speakers of the jukebox device, an instance of audio content stored on the first storage, (2) display, without involving the video server and on the display of the jukebox device, a first video content including a song selection screen while the instance of audio content is currently being played back, (3) instruct the video server in communication with the jukebox device to reproduce, in synchronization with the jukebox device, on one or more displays or groups of displays remote from the jukebox that are each connected to the video server, one or more second video content stored on a second storage location accessible by the video server, wherein at least one of the second video content, which is different from the first video content, is associated with the instance of audio content currently being played back, and (4) receive updated audio content from, and provide royalty accounting information to, a remotely located central server;
      a communication circuit through which the jukebox device is configured to receive updated audio content from, and provide royalty accounting information to, the central server; and
      a jukebox housing incorporating the display and the payment acceptor and the speakers, wherein the first storage location, the processor the communication circuit and the video server are located within said jukebox housing,
      wherein the video server is configured to coordinate playback of at least one of the second video content, receivable from a remote network location, on the one or more displays or groups of displays, and is further configured to access at least one of the second the video content stored on the second storage location independent of the first storage location of the jukebox device, the coordinated playback being substantially offloaded from the processor of the jukebox device and the first storage location to the video server.

14. The digital audiovisual distribution network of claim 13, wherein the video server is configured to further coordinate the video content displayed by the one or more displays or groups of displays in dependence on a predefined video playlist.

15. The digital audiovisual distribution network of claim 14, wherein the video playlist is stored in a centrally accessible storage location of the digital audiovisual distribution network.

16. The digital audiovisual distribution network of claim 14, wherein the video playlist includes instructions for displaying video content in a predetermined order, and at a predetermined time or event.

17. The digital audiovisual distribution network of claim 14, wherein the video playlist includes instructions for displaying video content corresponding to segment programming.

18. The digital audiovisual distribution network of claim 17, wherein the segment programming is displayed at a plurality of locations at substantially the same time.

19. The digital audiovisual distribution network of claim 13, wherein the video content displayed by the one or more displays or groups of displays corresponds to video content that prompts one or more viewers of said video content to interact, directly or indirectly, with the jukebox device.

20. The digital audiovisual distribution network of claim 13, wherein a first video server of a first jukebox device at a first location is configured to display programming substantially concurrently with a second video server of a second jukebox device at a second location.

21. The digital audiovisual distribution network of claim 20, wherein the programming is a concert.

22. A method of operating a digital jukebox device, the method comprising:
   causing a display of jukebox-related video content on a display of the digital jukebox device;

enabling playback, by the jukebox device, of a plurality of instances of audio content stored on a first storage location of the jukebox device;

enabling acceptance of payment, via a payment accepter, in exchange for playback of the instances of audio content by the jukebox device;

(1) playback, without involving a video server and via speakers of the jukebox device, an instance of audio content stored on the first storage, (2) display, without involving the video server and on the display of the jukebox device, a first video content including a song selection screen while the instance of audio content is currently being played back, (3) instructing, via a processor of the jukebox device, the video server in communication with and located within a housing of the jukebox device to reproduce, in synchronization with the jukebox device, on one or more displays or groups of displays remote from the jukebox that are each connected to the video server, one or more second video content stored on a second storage location accessible by the video server, wherein at least one of the second video content, which is different from the first video content, is associated with the instance of audio content currently being played back, and (4) receive updated audio content from, and provide royalty accounting information to, a remotely located central server;

receiving updated audio content from, and providing royalty accounting information to, a remotely located central server; and coordinating, via the video server, playback of at least one of the second video content, receivable from a remote network location, on the one or more displays or groups of displays, such that the video server accesses the at least one of the second video content stored on the second storage location independent of the first storage location of the jukebox device, the coordinated playback being substantially offloaded from the processor of the jukebox device and the first storage location to the video server.

23. The method of claim 22, further comprising coordinating the video content displayed by the one or more displays or groups of displays with the display of the jukebox device in dependence on a function being accessed by a user of the jukebox device.

24. The method of claim 22, further comprising coordinating the video content displayed by the one or more displays or groups of displays in dependence on a predefined video playlist.

25. The method of claim 24, wherein the video playlist includes instructions for displaying video content in a predetermined order, and at a predetermined time or event.

26. The method of claim 24, wherein the video playlist includes instructions for displaying video content corresponding to segment programming.

* * * * *